US011902759B2

(12) United States Patent
Zhou et al.

(10) Patent No.: US 11,902,759 B2
(45) Date of Patent: Feb. 13, 2024

(54) SYSTEMS AND METHODS FOR AUDIO SIGNAL GENERATION

(71) Applicant: SHENZHEN SHOKZ CO., LTD., Guangdong (CN)

(72) Inventors: Meilin Zhou, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 87 days.

(21) Appl. No.: 17/649,359

(22) Filed: Jan. 29, 2022

(65) Prior Publication Data

US 2022/0150627 A1 May 12, 2022

Related U.S. Application Data

(63) Continuation of application No. PCT/CN2019/105616, filed on Sep. 12, 2019.

(51) Int. Cl.
*H04R 3/04* (2006.01)
*H04R 1/10* (2006.01)
*H04R 3/00* (2006.01)

(52) U.S. Cl.
CPC ................ *H04R 3/04* (2013.01); *H04R 1/10* (2013.01); *H04R 3/002* (2013.01); *H04R 2460/13* (2013.01)

(58) Field of Classification Search
CPC . H04R 3/04; H04R 1/10; H04R 3/002; H04R 2460/13

(Continued)

(56) References Cited

U.S. PATENT DOCUMENTS 5,933,506 A 8/1999 Aoki et al.
8,612,215 B2 12/2013 Son et al.

(Continued)

FOREIGN PATENT DOCUMENTS

CN 103208291 A 7/2013
CN 105533986 A 5/2016

(Continued)

OTHER PUBLICATIONS

The Extended European Search Report in European Application No. 19945232.7 dated Jul. 15, 2022, 9 pages.

(Continued)

*Primary Examiner* — Thjuan K Addy
(74) *Attorney, Agent, or Firm* — METIS IP LLC

(57) ABSTRACT

The present disclosure provides systems and methods for audio signal generation. The method may include obtaining first audio data collected by a bone conduction sensor; and obtaining second audio data collected by an air conduction sensor, the first audio data and the second audio data representing a speech of a user, with differing frequency component. The method may also include generating, based on the first audio data and the second audio data, third audio data, wherein frequency components of the third audio data higher than a frequency point increase with respect to frequency components of the first audio data higher than the first frequency point. In some embodiments, the method may further include determining, based on the third audio data, target audio data representing the speech of the user with better fidelity than the first audio data and the second audio data.

20 Claims, 16 Drawing Sheets

(58) Field of Classification Search
USPC .................................... 381/98, 62, 100, 101
See application file for complete search history.

(56) References Cited

U.S. PATENT DOCUMENTS

| | | | | |
|---|---|---|---|---|
| 8,751,224 | B2 | 6/2014 | Herve et al. | |
| 11,290,802 | B1 * | 3/2022 | Nandy | G10L 15/08 |
| 11,705,133 | B1 * | 7/2023 | Aggarwal | G10L 17/08 704/246 |
| 2005/0185813 | A1 | 8/2005 | Sinclair et al. | |
| 2006/0293887 | A1 | 12/2006 | Zhang et al. | |
| 2014/0363020 | A1 | 12/2014 | Endo | |

FOREIGN PATENT DOCUMENTS

| | | | |
|---|---|---|---|
| CN | 108696797 | A | 10/2018 |
| CN | 109240639 | A | 1/2019 |
| CN | 109545193 | A | 3/2019 |
| CN | 109767783 | A | 5/2019 |
| CN | 109982179 | A | 7/2019 |
| CN | 110136731 | A | 8/2019 |
| CN | 114424581 | A | 4/2022 |
| EP | 0683621 | A2 | 11/1995 |
| EP | 2811485 | A1 | 12/2014 |
| JP | H0630490 | A | 2/1994 |
| JP | H08223677 | A | 8/1996 |
| JP | H1023122 | A | 1/1998 |
| JP | 2000261534 | A | 9/2000 |
| JP | 2004279768 | A | 10/2004 |
| JP | 2007251354 | A | 9/2007 |
| JP | 2010176042 | A | 8/2010 |
| JP | 2014096732 | A | 5/2014 |
| WO | 2013162995 | A2 | 10/2013 |

OTHER PUBLICATIONS

Ho Seon Shin et al., Survey of Speech Enhancement Supported by a Bone Conduction Microphone, Speech Communication, 2012, 4 pages.
Office Action in Russian Application No. 2022105378 dated Oct. 27, 2022, 26 pages.
Notice of Reasons for Rejection in Japanese Application No. 2022515512 dated Apr. 25, 2023, 8 pages.
International Search Report in PCT/CN2019/105616 dated Jun. 15, 2020, 5 pages.
Written Opinion in PCT/CN2019/105616 dated Jun. 15, 2020, 4 pages.
Huang, Boyan et al., A Wearable Bone-Conducted Speech Enhancement System for Strong Background Noises, 2017 18th International Conference on Electronic Packaging Technology, 2017, 3 pages.
Notice of Rejection in Japanese Application No. 2022-515512 dated Oct. 24, 2023, 6 pages.

* cited by examiner

SYSTEMS AND METHODS FOR AUDIO SIGNAL GENERATION

CROSS-REFERENCE TO RELATED APPLICATIONS

This application is a continuation of International Application No. PCT/CN/2019/105616, filed on Sep. 12, 2019, the entire contents of which are hereby incorporated by reference.

TECHNICAL FIELD

The present disclosure generally relates to signal processing fields, and specifically, to systems and methods for audio signal generation based on a bone conduction audio signal and an air conduction audio signal.

BACKGROUND

With the widespread use of electronic devices, communication between people is becoming more and more convenient. When using an electronic device for communication, a user can rely on a microphone to collect voice signals when the user speaks. The voice signal collected by the microphone may represent a speech of the user. However, sometimes it is difficult to ensure that the voice signals collected by the microphone are sufficiently intelligible (i.e., the level of fidelity of the signals) due to, for example, the performance of the microphone itself, noises, etc. Especially in the public, such as factories, cars, airplanes, boats, shopping malls, etc., different background noises seriously affect the quality of communication. Thus, it is desirable to provide systems and methods for generating an audio signal with less noises and/or improved fidelity.

SUMMARY

According to a first aspect of the present disclosure, a system for audio signal generation is provided. The system may include at least one storage medium and at least one processor in communication with the at least one storage medium. The at least one storage medium may include a set of instructions. When executing the set of instructions, the system may be configured to perform one or more of the following operations. The system may obtain first audio data collected by a bone conduction sensor. The system may obtain second audio data collected by an air conduction sensor. The first audio data and the second audio data may represent a speech of a user, with differing frequency components. The system may generate third audio data based on the first audio data and the second audio data. Frequency components of the third audio data higher than a first frequency point may increase with respect to frequency components of the first audio data higher than the frequency point.

In some embodiments, the system may perform a first preprocessing operation on the first audio data to obtain preprocessed first audio data. The system may generate, based on the preprocessed first audio data and the second audio data, the third audio data.

In some embodiments, the first preprocessing operation may include a normalization operation.

In some embodiments, the system may obtain a trained machine learning model. The system may determine, based on the first audio data, the preprocessed first audio data using the trained machine learning model. Frequency components of the preprocessed first audio data higher than a second frequency point may increase with respect to frequency components of the first audio data higher than the second frequency point.

In some embodiments, the system may obtain a plurality of groups of training data. Each group of the plurality of groups of training data may include bone conduction audio data and air conduction audio data representing a speech sample. The system may train a preliminary machine learning model using the plurality of groups of training data. The bone conduction audio data in each group of the plurality of groups of training data may be as an input of the preliminary machine learning model, and the air conduction audio data corresponding to the bone conduction audio data may be as a desired output of the preliminary machine learning model during a training process of the preliminary machine learning model.

In some embodiments, a region of a body where a specific bone conduction sensor is positioned for collecting the bone conduction audio data in each group of the plurality of groups of training data may be same as a region of a body of the user where the bone conduction sensor is positioned for collecting the first audio data.

In some embodiments, the preliminary machine learning model may be constructed based on a recurrent neural network model or a long short-term memory network.

In some embodiments, the system may obtain a filter configured to provide a relationship between specific air conduction audio data and specific bone conduction audio data corresponding to the specific air conduction audio data. The system may determine the preprocessed first audio data using the filter to process the first audio data.

In some embodiments, the system may perform a second preprocessing operation on the second audio data to obtain preprocessed second audio data. The system may generate, based on the first audio data and the preprocessed second audio data, the third audio data.

In some embodiments, the second preprocessing operation may include a denoising operation.

In some embodiments, the system may determine, at least in part based on at least one of the first audio data or the second audio data, one or more frequency thresholds. The system may generate, based on the one or more frequency thresholds, the first audio data and the second audio data, the third audio data.

In some embodiments, the system may determine a noise level associated with the second audio data. The system may determine, based on the noise level associated with the second audio data, at least one of the one or more frequency thresholds.

In some embodiments, the noise level associated with the second audio data may be denoted by a signal to noise ratio (SNR) of the second audio data. The system may determine the SNR of the second audio data by the following processing. The system may determine an energy of noises included in the second audio data using the bone conduction sensor and the air conduction sensor. The system may determine, based on the energy of noises included in the second audio data, an energy of pure audio data included in the second audio data. The system may determine the SNR based on the energy of noises included in the second audio data and the energy of pure audio data included in the second audio data.

In some embodiments, the greater the noise level associated with the second audio data is, the greater at least one of the one or more frequency thresholds may be.

In some embodiments, the system may determine at least one of the one or more frequency thresholds based on a frequency response curve associated with the first audio data.

In some embodiments, the system may stitch the first audio data and the second audio data in a frequency domain according to the one or more frequency thresholds to generate the third audio data.

In some embodiments, the system may determine a lower portion of the first audio data including frequency components lower than one of the one or more frequency thresholds. The system may determine a higher portion of the second audio data including frequency components higher than the one of the one or more frequency thresholds. The system may stitch the lower portion of the first audio data and the higher portion of the second audio data to generate the third audio data.

In some embodiments, the system may determine multiple frequency ranges. The system may determine a first weight and a second weight for a portion of the first audio data and a portion of the second audio data located within each of the multiple frequency ranges, respectively. The system may determine the third audio data by weighting the portion of the first audio data and the portion of the second audio data located within each of the multiple frequency ranges using the first weight and the second weight, respectively.

In some embodiments, the system may determine, at least in part based on the frequency point, a first weight and a second weight for a first portion of the first audio data and a second portion of the first audio data, respectively. The first portion of the first audio data may include frequency components lower than the frequency point, and the second portion of the first audio data may include frequency components higher than the frequency point. The system may determine, at least in part based on the frequency point, a third weight and a fourth weight for a third portion of the second audio data and a fourth portion of the second audio data, respectively. The third portion of the second audio data may include frequency components lower than the frequency point, and the fourth portion of the second audio data may include frequency components higher than the frequency point. The system may determine the third audio data by weighting the first portion of the first audio data, the second portion of the first audio data, the third portion of the second audio data, and the fourth portion of the second audio data using the first weight, the second weight, the third weight, and the fourth weight, respectively.

In some embodiments, the system may determine, at least in part based on at least one of the first audio data or the second audio data, a first weight corresponding to the first audio data. The system may determine, at least in part based on at least one of the first audio data or the second audio data, a second weight corresponding to the second audio data. The system may determine the third audio data by weighting the first audio data and the second audio data using the first weight and the second weight, respectively.

In some embodiments, the system may perform a post-processing operation on the third audio data to obtain target audio data representing the speech of the user with better fidelity than the first audio data and the second audio data.

In some embodiments, the post-processing operation includes a denoising operation.

According to a second aspect of the present disclosure, a method for audio signal generation is provided. The method may be implemented on at least one computing device, each of which may include at least one processor and a storage device. The method may include one or more of the following operations. The method may include obtaining first audio data collected by a bone conduction sensor; obtaining second audio data collected by an air conduction sensor, the first audio data and the second audio data representing a speech of a user, with differing frequency components; generating, based on the first audio data and the second audio data, third audio data, wherein frequency components of the third audio data higher than a first frequency point increase with respect to frequency components of the first audio data higher than the frequency point.

According to a third aspect of the present disclosure, a system for audio signal generation is provided. The system may include an obtaining module configured to obtain first audio data collected by a bone conduction sensor, and second audio data collected by an air conduction sensor. The first audio data and the second audio data may represent a speech of a user, with differing frequency components. The system may also include an audio data generation module configured to generate, based on the first audio data and the second audio data, third audio data. Frequency components of the third audio data higher than a first frequency point may increase with respect to frequency components of the first audio data higher than the frequency point.

According to a fourth aspect of the present disclosure, a non-transitory computer readable medium is provided. The non-transitory computer readable medium may include at least one set of instructions that, when executed by at least one processor, cause the at least one processor to effectuate a method. The at least one processor may obtain first audio data collected by a bone conduction sensor. The at least one processor may obtain second audio data collected by an air conduction sensor. The first audio data and the second audio data may represent a speech of a user, with differing frequency components. The at least one processor may generate, based on the first audio data and the second audio data, third audio data. Frequency components of the third audio data higher than a first frequency point may increase with respect to frequency components of the first audio data higher than the frequency point.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
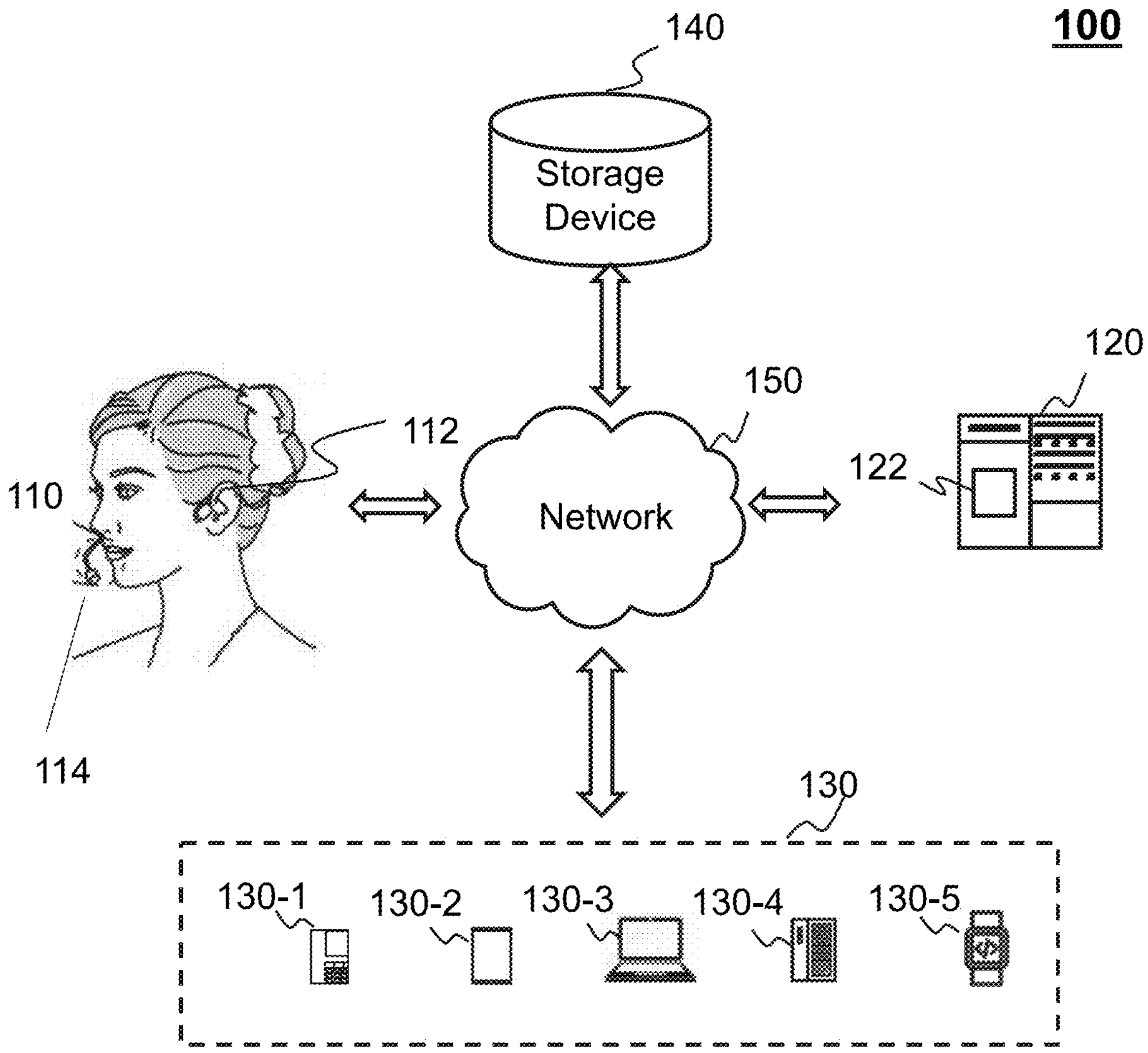
FIG. 1 is a schematic diagram illustrating an exemplary audio signal generation system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

The present disclosure provides systems and methods for audio signal generation. The systems and methods may obtain first audio data collected by a bone conduction sensor (also referred to as bone conduction audio data). The systems and methods may obtain second audio data collected by an air conduction sensor (also referred to as air conduction audio data). The bone conduction audio data and the air conduction audio data may represent a speech of a user, with differing frequency components. The systems and methods may generate based on the bone conduction audio data and the air conduction audio data, audio data. Frequency components of the generated audio data higher than a frequency point may increase with respect to frequency components of the bone conduction audio data higher than the frequency point. In some embodiments, the systems and methods may determine, based on the generated audio data, target audio data representing the speech of the user with better fidelity than the bone conduction audio data and the air conduction audio data. According to the present disclosure, the audio data generated based on the bone conduction audio data and the air conduction audio data may include more higher frequency components than the bone conduction audio data and/or less noises than the air conduction audio data, which may improve fidelity and intelligibility of the generated audio data with respect to the bone conduction audio data and/or the air conduction audio data. In some embodiments, the systems and methods may further include reconstructing the bone conduction audio data to obtain reconstructed bone conduction audio data more similar or close to the air conduction audio data by increasing higher frequency components of the bone conduction audio data, which may improve the quality of the reconstructed bone conduction audio data with respect to the bone conduction audio data, and further the quality of the generated audio data. In some embodiments, the systems and methods may generate, based on the bone conduction audio data and the air conduction audio data, the audio data according to one or more frequency thresholds, also referred to as frequency stitching points. The frequency stitching points may be determined based on noise level associated with the air conduction audio data, which may decrease the noises of the generated audio data and improve the fidelity of the generated audio data simultaneously.

FIG. 1 is a schematic diagram illustrating an exemplary audio signal generation system 100 according to some embodiments of the present disclosure. The audio signal generation system 100 may include an audio collection device 110, a server 120, a terminal 130, a storage device 140, and a network 150.

The audio collection device 110 may obtain audio data (e.g., an audio signal) by collecting a sound, voice or speech of a user when the user speaks. For example, when the user speaks, the sound of the user may incur vibrations of air around the mouth of the user and/or vibrations of tissues of the body (e.g., the skull) of the user. The audio collection device 110 may receive the vibrations and convert the vibrations into electrical signals (e.g., analog signals or digital signals), also referred to as the audio data. The audio data may be transmitted to the server 120, the terminal 130, and/or the storage device 140 via the network 150 in the form of the electrical signals. In some embodiments, the audio collection device 110 may include a recorder, a headset, such as a blue tooth headset, a wired headset, a hearing aid device, etc.

In some embodiments, the audio collection device 110 may be connected with a loudspeaker via a wireless connection (e.g., the network 150) and/or wired connection. The audio data may be transmitted to the loudspeaker to play and/or reproduce the speech of the user. In some embodiments, the loudspeaker and the audio collection device 110 may be integrated into one single device, such as a headset. In some embodiments, the audio collection device 110 and the loudspeaker may be separated from each other. For example, the audio collection device 110 may be installed in a first terminal (e.g., a headset) and the loudspeaker may be installed in another terminal (e.g., the terminal 130).

In some embodiments, the audio collection device 110 may include a bone conduction microphone 112 and an air conduction microphone 114. The bone conduction microphone 112 may include one or more bone conduction sensors for collecting bone conduction audio data. The bone conduction audio data may be generated by collecting a vibration signal of the bones (e.g., the skull) of a user when the user speaks. In some embodiments, the one or more bone conduction sensors may form a bone conduction sensor array. In some embodiments, the bone conduction microphone 112 may be positioned at and/or contact with a region of the user's body for collecting the bone conduction audio data. The region of the user's body may include the forehead, the neck (e.g., the throat), the face (e.g., an area around the mouth, the chin), the top of the head, a mastoid, an area around an ear or an area inside of an ear, a temple, or the like, or any combination thereof. For example, the bone conduction microphone 112 may be positioned at and/or contact with the ear screen, the auricle, the inner auditory meatus, the external auditory meatus, etc. In some embodiments, one or more characteristics of the bone conduction audio data may be different according to the region of the user's body where the bone conduction microphone 112 is positioned and/or in contact with. For example, the bone conduction audio data collected by the bone conduction microphone 112 positioned at the area around an ear may include high energy than that collected by the bone conduction microphone 112 positioned at the forehead. The air conduction microphone 114 may include one or more air conduction sensors for collecting air conduction audio data conducted through the air when a user speaks. In some embodiments, the one or more air conduction sensors may form an air conduction sensor array. In some embodiments, the air conduction microphone 114 may be positioned within a distance (e.g., 0 cm, 1 cm, 2 cm, 5 cm, 10 cm, 20 cm, etc.) from the mouth of the user. One or more characteristics of the air conduction audio data (e.g., an average amplitude of the air conduction audio data) may be different according to different distances between the air conduction microphone 114 and the mouth of the user. For example, the greater the different distance between the air conduction microphone 114 and the mouth of the user is, the less the average amplitude of the air conduction audio data may be.

In some embodiments, the server 120 may be a single server or a server group. The server group may be centralized (e.g., a data center) or distributed (e.g., the server 120 may be a distributed system). In some embodiments, the server 120 may be local or remote. For example, the server 120 may access information and/or data stored in the terminal 130, and/or the storage device 140 via the network 150. As another example, the server 120 may be directly connected to the terminal 130, and/or the storage device 140 to access stored information and/or data. In some embodiments, the server 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 120 may be implemented on a computing device 200 having one or more components illustrated in FIG. 2 in the present disclosure.

In some embodiments, the server 120 may include a processing device 122. The processing device 122 may process information and/or data related to audio signal generation to perform one or more functions described in the present disclosure. For example, the processing device 122 may obtain bone conduction audio data collected by the bone conduction microphone 112 and air conduction audio data collected by the air conduction microphone 114, wherein the bone conduction audio data and the air conduction audio data representing a speech of a user. The processing device 122 may generate target audio data based on the bone conduction audio data and the air conduction audio data. As another example, the processing device 122 may obtain a trained machine learning model and/or a constructed filter from the storage device 140 or any other storage device. The processing device 122 may reconstruct the bone audio data using the trained machine learning model and/or the constructed filter. As a further example, the processing device 122 may determine the trained machine learning model by training a preliminary machine learning model using a plurality of groups of speech samples. Each of the plurality of speech samples may include bone conduction audio data and air conduction audio data representing a speech of a user. As still another example, the processing device 122 may perform a denoising operation on the air conduction audio data to obtain denoised air conduction audio data. The processing device 122 may generate target audio data based on the reconstructed bone conduction audio data and the denoised air conduction audio data. In some embodiments, the processing device 122 may include one or more processing engines (e.g., single-core processing engine(s) or multi-core processor(s)). Merely by way of example, the processing device 122 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In some embodiments, the terminal 130 may include a mobile device 130-1, a tablet computer 130-2, a laptop computer 130-3, a built-in device in a vehicle 130-4, a wearable device 130-5, or the like, or any combination thereof. In some embodiments, the mobile device 130-1 may include a smart home device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include Google™ Glasses, an Oculus Rift, a HoloLens, a Gear VR, etc. In some embodiments, the built-in device in the vehicle 130-4 may include an onboard computer, an onboard television, etc. In some embodiments, the terminal 130 may be a device with positioning technology for locating the position of the passenger and/or the terminal 130. In some embodiments, the wearable device 130-5 may include a smart bracelet, a smart footgear, smart glasses, a smart helmet, a smartwatch, smart clothing, a smart backpack, a smart accessory, or the like, or any combination thereof. In some embodiments, the audio collection device 110 and the terminal 130 may be integrated into one single device.

The storage device 140 may store data and/or instructions. For example, the storage device 140 may store data of a plurality of groups of speech samples, one or more machine learning models, a trained machine learning model and/or a constructed filter, audio data collected by the bone conduction microphone 112 and air conduction microphone 114, etc. In some embodiments, the storage device 140 may store data obtained from the terminal 130 and/or the audio collection device 110. In some embodiments, the storage device 140 may store data and/or instructions that the server 120 may execute or use to perform exemplary methods described in the present disclosure. In some embodiments, storage device 140 may include a mass storage, removable storage, a volatile read-and-write memory, a read-only memory (ROM), or the like, or any combination thereof. Exemplary mass storage may include a magnetic disk, an optical disk, solid-state drives, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 150 to communicate with one or more components of the audio signal generation system 100 (e.g., the audio collection device 110, the server 120, and the terminal 130). One or more components of the audio signal generation system 100 may access the data or instructions stored in the storage device 140 via the network 150. In some embodiments, the storage device 140 may be directly connected to or communicate with one or more components of the audio signal generation system 100 (e.g., the audio collection device 110, the server 120, and the terminal 130). In some embodiments, the storage device 140 may be part of the server 120.

The network 150 may facilitate the exchange of information and/or data. In some embodiments, one or more components (e.g., the audio collection device 110, the server 120, the terminal 130, and the storage device 140) of the audio signal generation system 100 may transmit information and/or data to other component(s) of the audio signal generation system 100 via the network 150. For example, the server 120 may obtain bone conduction audio data and air conduction audio data from the terminal 130 via the network 150. In some embodiments, the network 150 may be any type of wired or wireless network, or combination thereof. Merely by way of example, the network 150 may include a cable network, a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 150 may include one or more network access points. For example, the network 150 may include wired or wireless network access points such as base stations and/or internet exchange points, through which one or more components of the audio signal generation system 100 may be connected to the network 150 to exchange data and/or information.

One of ordinary skill in the art would understand that when an element (or component) of the audio signal generation system 100 performs, the element may perform through electrical signals and/or electromagnetic signals. For example, when a bone conduction microphone 112 transmits out bone conduction audio data to the server 120, a processor of the bone conduction microphone 112 may generate an electrical signal encoding the bone conduction audio data. The processor of the bone conduction microphone 112 may then transmit the electrical signal to an output port. If the bone conduction microphone 112 communicates with the server 120 via a wired network, the output port may be physically connected to a cable, which further may transmit the electrical signal to an input port of the server 120. If the bone conduction microphone 112 communicates with the server 120 via a wireless network, the output port of the bone conduction microphone 112 may be one or more antennas, which convert the electrical signal to electromagnetic signal. Similarly, an air conduction microphone 114 may transmit out air conduction audio data to the server 120 via electrical signal or electromagnet signals. Within an electronic device, such as the terminal 130 and/or the server 120, when a processor thereof processes an instruction, transmits out an instruction, and/or performs an action, the instruction and/or action is conducted via electrical signals. For example, when the processor retrieves or saves data from a storage medium, it may transmit out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
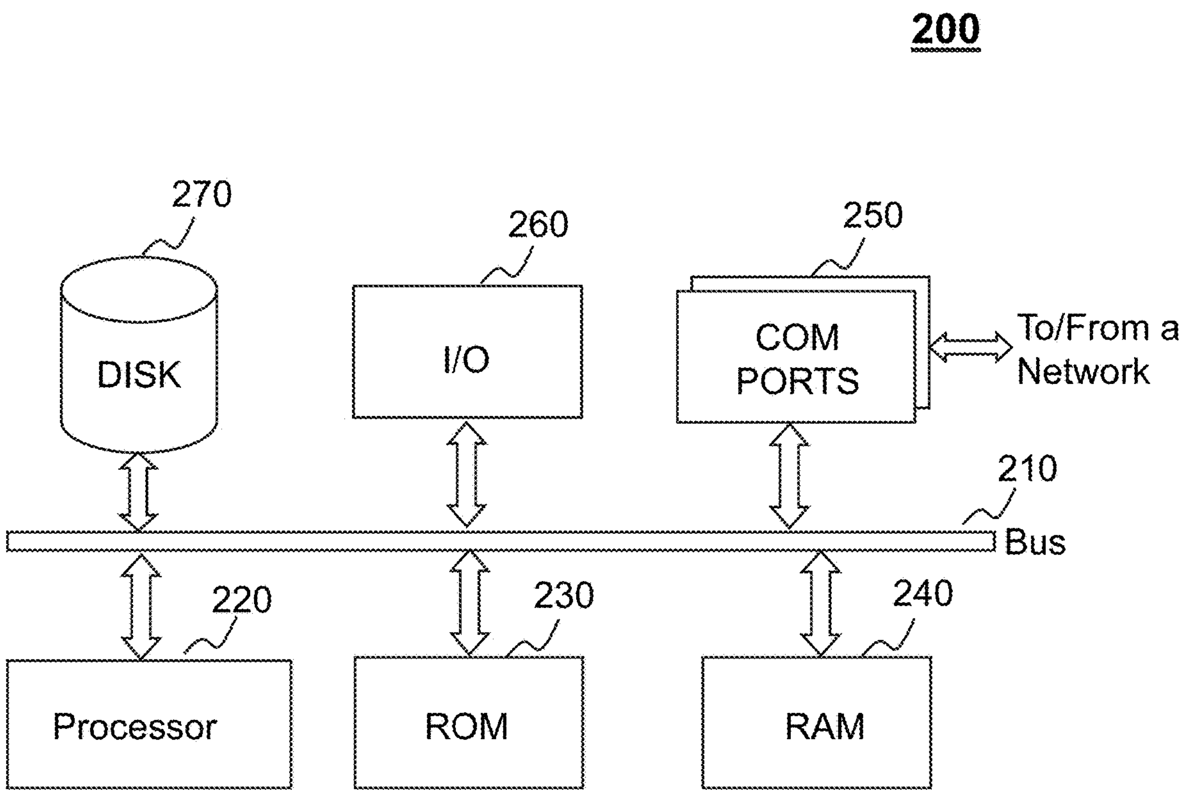
FIG. 2 is a schematic diagram illustrating exemplary hardware and software components of a computing device according to some embodiments of the present disclosure.

FIG. 2 illustrates a schematic diagram of an exemplary computing device according to some embodiments of the present disclosure. The computing device may be a computer, such as the server 120 in FIG. 1 and/or a computer with specific functions, configured to implement any particular system according to some embodiments of the present disclosure. Computing device 200 may be configured to implement any components that perform one or more functions disclosed in the present disclosure. For example, the server 120 may be implemented in hardware devices, software programs, firmware, or any combination thereof of a computer like computing device 200. For brevity, FIG. 2 depicts only one computing device. In some embodiments, the functions of the computing device may be implemented by a group of similar platforms in a distributed mode to disperse the processing load of the system.

The computing device 200 may include communication ports 250 that may connect with a network that may implement data communication. The computing device 200 may also include a processor 220 that is configured to execute instructions and includes one or more processors. The schematic computer platform may include an internal communication bus 210, different types of program storage units and data storage units (e.g., a hard disk 270, a read-only memory (ROM) 230, a random-access memory (RAM) 240), various data files applicable to computer processing and/or communication, and some program instructions executed possibly by the processor 220. The computing device 200 may also include an I/O device 260 that may support the input and output of data flows between computing device 200 and other components. Moreover, the computing device 200 may receive programs and data via the communication network.

Figure 3:
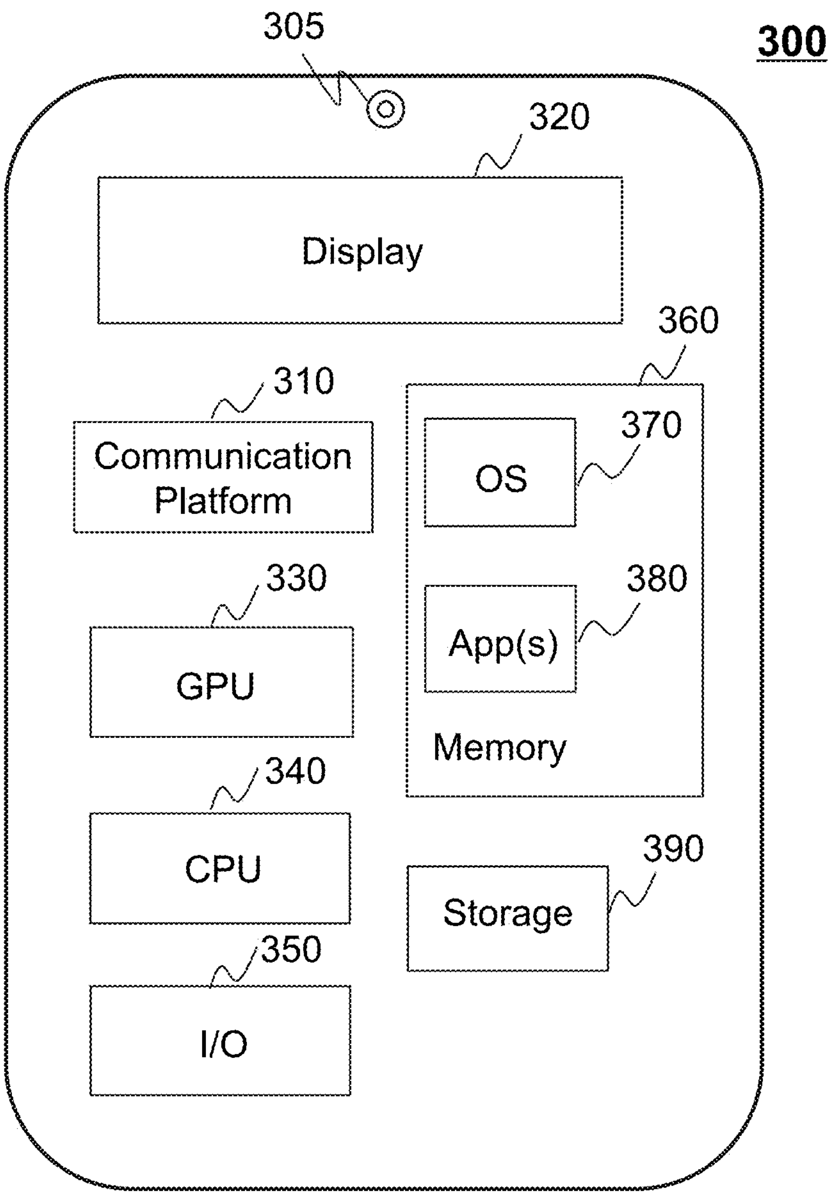
FIG. 3 is a schematic diagram illustrating exemplary hardware and/or software components of a mobile device according to some embodiments of the present disclosure.

FIG. 3 is a schematic diagram illustrating exemplary hardware and/or software components of an exemplary mobile device according to some embodiments of the present disclosure. As illustrated in FIG. 3, the mobile device 300 may include a camera 305, a communication platform 310, a display 320, a graphic processing unit (GPU) 330, a central processing unit (CPU) 340, an I/O 350, a memory 360, a mobile operating system (OS) 370, application (s), and a storage 390. In some embodiments, any other suitable component, including but not limited to a system bus or a controller (not shown), may also be included in the mobile device 300.

In some embodiments, the mobile operating system 370 (e.g., iOS™, Android™ Windows Phone™, etc.) and one or more applications 380 may be loaded into the memory 360 from the storage 390 in order to be executed by the CPU 340. The applications 380 may include a browser or any other suitable mobile apps for receiving and rendering information relating to audio data processing or other information from the audio signal generation system 100. User interactions with the information stream may be achieved via the I/O 350 and provided to the database 130, the server 105 and/or other components of the audio signal generation system 100. In some embodiments, the mobile device 300 may be an exemplary embodiment corresponding to the terminal 130.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to generate audio and/or obtain speech samples as described herein. A computer with user interface elements may be used to implement a personal computer (PC) or other types of work station or terminal device, although a computer may also act as a server if appropriately programmed. It is believed that those skilled in the art are familiar with the structure, programming and general operation of such computer equipment and as a result the drawings should be self-explanatory.

One of ordinary skill in the art would understand that when an element of the system 100 performs, the element may perform through electrical signals and/or electromagnetic signals. For example, when the server 120 processes a task, such as determining a trained machine learning model, the server 120 may operate logic circuits in its processor to process such task. When the server 120 completes determining the trained machine learning model, the processor of the server 120 may generate electrical signals encoding the trained machine learning model. The processor of the server 120 may then send the electrical signals to at least one data exchange port of a target system associated with the server 120. The server 120 communicates with the target system via a wired network, the at least one data exchange port may be physically connected to a cable, which may further transmit the electrical signals to an input port (e.g., an information exchange port) of the terminal 130. If the server 120 communicates with the target system via a wireless network, the at least one data exchange port of the target system may be one or more antennas, which may convert the electrical signals to electromagnetic signals. Within an electronic device, such as the terminal 130, and/or the server 120, when a processor thereof processes an instruction, sends out an instruction, and/or performs an action, the instruction and/or action is conducted via electrical signals. For example, when the processor retrieves or saves data from a storage medium (e.g., the storage device 140), it may send out electrical signals to a read/write device of the storage medium, which may read or write structured data in the storage medium. The structured data may be transmitted to the processor in the form of electrical signals via a bus of the electronic device. Here, an electrical signal may be one electrical signal, a series of electrical signals, and/or a plurality of discrete electrical signals.

Figure 4A:
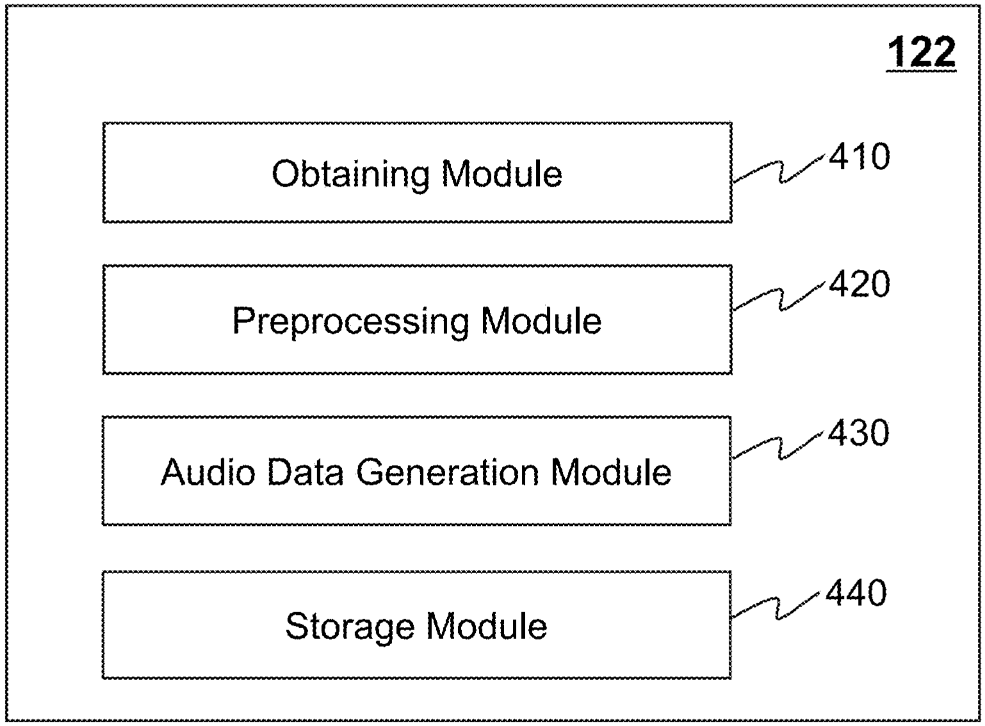
FIG. 4A is a block diagram illustrating an exemplary processing device according to some embodiments of the present disclosure.

FIG. 4A is a block diagram illustrating an exemplary processing device according to some embodiments of the present disclosure. In some embodiments, the processing device 122 may be implemented on a computing device 200 (e.g., the processor 220) illustrated in FIG. 2 or a CPU 340 as illustrated in FIG. 3. As shown in FIG. 4A, the processing device 122 may include an obtaining module 410, a preprocessing module 420, an audio data generation module 430, and a storage module 440. Each of the modules described above may be a hardware circuit that is designed to perform certain actions, e.g., according to a set of instructions stored in one or more storage media, and/or any combination of the hardware circuit and the one or more storage media.

The obtaining module 410 may be configured to obtain data for audio signal generation. For example, the obtaining module 410 may obtain original audio data, one or more models, training data for training a machine learning model, etc. In some embodiments, the obtaining module 410 may obtain first audio data collected by a bone conduction sensor. As used herein, the bone conduction sensor may refer to any sensor (e.g., the bone conduction microphone 112) that may collect vibration signals conducted through the bone (e.g., the skull) of a user generated when the user speaks as described elsewhere in the present disclosure (e.g., FIG. 1 and the descriptions thereof). In some embodiments, the first audio data may include an audio signal in a time domain, an audio signal in a frequency domain, etc. The first audio data may include an analog signal or a digital signal. The obtaining module 410 may be also configured to obtain second audio data collected by an air conduction sensor. The air conduction sensor may refer to any sensor (e.g., the air conduction microphone 114) that may collect vibration signals conducted through the air when a user speaks as described elsewhere in the present disclosure (e.g., FIG. 1 and the descriptions thereof). In some embodiments, the second audio data may include an audio signal in a time domain, an audio signal in a frequency domain, etc. The second audio data may include an analog signal or a digital signal. In some embodiments, the obtaining module 410 may obtain a trained machine learning model, a constructed filter, a harmonic correction model, etc., for reconstructing the first audio data, etc. In some embodiments, the processing device 122 may obtain the one or more models, the first audio data and/or the second audio data from the air conduction sensor (e.g., the air conduction microphone 114), the terminal 130, the storage device 140, or any other storage device via the network 150 in real time or periodically.

The preprocessing module 420 may be configured to preprocess at least one of the first audio data or the second audio data. The first audio data and the second audio data after being preprocessed may be also referred to as preprocessed first audio data and preprocessed second audio data respectively. Exemplary preprocessing operations may include a domain transform operation, a signal calibration operation, an audio reconstruction operation, a speech enhancement operation, etc. In some embodiments, the preprocessing module 420 may perform a domain transform operation by performing a Fourier transform or an inverse Fourier transform. In some embodiments, the preprocessing module 420 may perform a normalization operation on the first audio data and/or the second audio data to obtain normalized first audio data and/or normalized second audio data for calibrating the first audio data and/or the second audio data. In some embodiments, the preprocessing module 420 may perform a speech enhancement operation on the second audio data (or the normalized second audio data). In some embodiments, the preprocessing module 420 may perform a denoising operation on the second audio data (or the normalized second audio data) to obtain denoised second audio data. In some embodiments, the preprocessing module 420 may perform an audio reconstruction operation on the first audio data (or the normalized first audio data) to generate reconstructed first audio data using a trained machine learning model, a constructed filer, a harmonic correction model, a sparse matrix technique, or the like, or any combination thereof.

The audio data generation module 430 may be configured to generate third audio data based on the first audio data (or the preprocessed first audio data) and the second audio data (or the preprocessed second audio data). In some embodiments, a noise level associated with the third audio data may be lower than a noise level associated with the second audio data (or the preprocessed second audio data). In some embodiments, the audio data generation module 430 may generate the third audio data based on the first audio data (or the preprocessed first audio data) and the second audio data (or the preprocessed second audio data) according to one or more frequency thresholds. In some embodiments, the audio data generation module 430 may determine one single frequency threshold. The audio data generation module 430 may stitch the first audio data (or the preprocessed first audio data) and the second audio data (or the preprocessed second audio data) in a frequency domain according to the one single frequency threshold to generate the third audio data.

In some embodiments, the audio data generation module 430 may determine, at least in part based on a frequency threshold, a first weight and a second weight for the lower portion of the first audio data (or the preprocessed first audio data) and the higher portion of the first audio data (or the preprocessed first audio data), respectively. The lower portion of the first conduction audio data (or the preprocessed first audio data) may include frequency components of the first conduction audio data (or the preprocessed first audio data) lower than the frequency threshold, and the higher portion of the first conduction audio data (or the preprocessed first audio data) may include frequency components of the first conduction audio data (or the preprocessed first audio data) higher than the frequency threshold. In some embodiments, the audio data generation module 430 may determine, at least in part based on the frequency threshold, a third weight and a fourth weight for the lower portion of the second audio data (or the preprocessed second audio data) and the higher portion of the second audio data (or the preprocessed second audio data), respectively. The lower portion of the second conduction audio data (or the preprocessed second audio data) may include frequency components of the second conduction audio data (or the preprocessed second audio data) lower than the frequency threshold, and the higher portion of the second conduction audio data (or the preprocessed second audio data) may include frequency components of the second conduction audio data (or the preprocessed second audio data) higher than the frequency threshold. In some embodiments, the audio data generation module 430 may determine the third audio data by weighting the lower portion of the first audio data (or the preprocessed first audio data), the higher portion of the first audio data (or the preprocessed first audio data), the lower portion of the second audio data (or the preprocessed second audio data), the higher portion of the second audio data (or the preprocessed second audio data) using the first weight, the second weight, the third weight, and the fourth weight, respectively.

In some embodiments, the audio data generation module 430 may determine a weight corresponding to the first audio data (or the preprocessed first audio data) and a weight corresponding to the second audio data (or the preprocessed second audio data) at least in part based on at least one of the first audio data (or the preprocessed first audio data) or the second audio data (or the preprocessed second audio data). The audio data generation module 430 may determine the third audio data by weighting the first audio data (or the preprocessed first audio data) and the second audio data (or the preprocessed second audio data) using the weight corresponding to the first audio data (or the preprocessed first audio data) and the weight corresponding to the second audio data (or the preprocessed second audio data).

In some embodiments, the audio data generation module 430 may determine, based on the third audio data, target audio data representing the speech of the user with better fidelity than the first audio data and the second audio data. In some embodiments, the audio data generation module 430 may designate the third audio data as the target audio data. In some embodiments, the audio data generation module 430 may perform a post-processing operation on the third audio data to obtain the target audio data. In some embodiments, the audio data generation module 430 may perform a denoising operation on the third audio data to obtain the target audio data. In some embodiments, the audio data generation module 430 may perform an inverse Fourier transform operation on the third audio data in the frequency domain to obtain the target audio data in the time domain. In some embodiments, the audio data generation module 430 may transmit a signal to a client terminal (e.g., the terminal 130), the storage device 140, and/or any other storage device (not shown in the audio signal generation system 100) via the network 150. The signal may include the target audio data. The signal may be also configured to direct the client terminal to play the target audio data.

The storage module 440 may be configured to store data and/or instructions associated with the audio signal generation system 100. For example, the storage module 440 may store data of a plurality of speech samples, one or more machine learning models, a trained machine learning model and/or a constructed filter, audio data collected by the bone conduction microphone 112 and/or the air conduction microphone 114, etc. In some embodiments, the storage module 440 may be the same as the storage device 140 in the configuration.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, the storage module 440 may be omitted. As another example, the audio data generation module 430 and the storage module 440 may be integrated into one module.

Figure 4B:
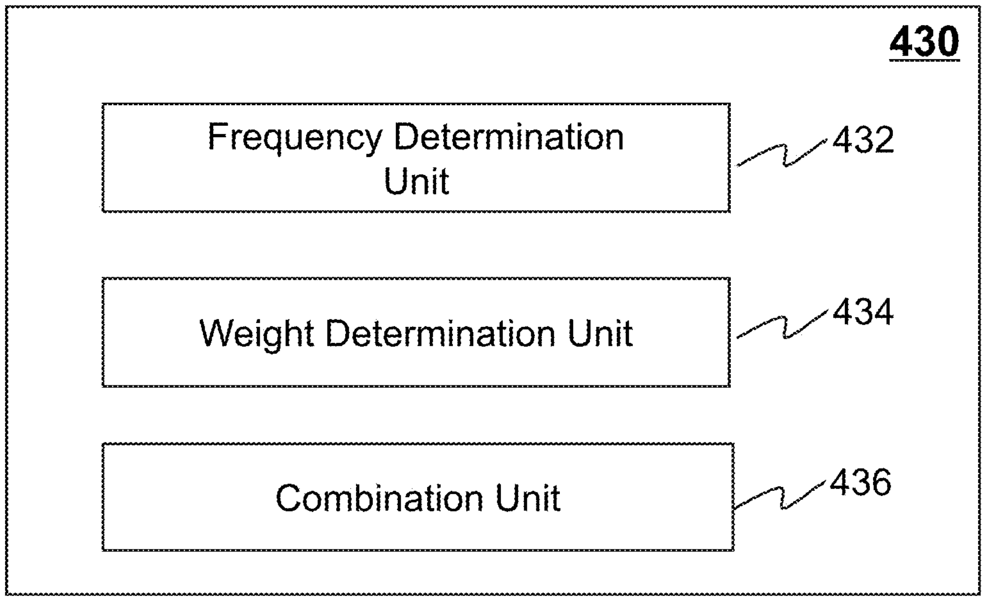
FIG. 4B is a block diagram illustrating an exemplary audio data generation module according to some embodiments of the present disclosure.

FIG. 4B is a block diagram illustrating an exemplary audio data generation module according to some embodiments of the present disclosure. As shown in FIG. 4B, the audio data generation module 430 may include a frequency determination unit 432, a weight determination unit 434 and a combination unit 436. Each of the sub-modules described above may be a hardware circuit that is designed to perform certain actions, e.g., according to a set of instructions stored in one or more storage media, and/or any combination of the hardware circuit and the one or more storage media.

The frequency determination unit 432 may be configured to determine one or more frequency thresholds at least in part based on at least one of bone conduction audio data or air conduction audio data. In some embodiments, a frequency threshold may be a frequency point of the bone conduction audio data and/or the air conduction audio data. In some embodiments, a frequency threshold may be different from a frequency point of the bone conduction audio data and/or the air conduction audio data. In some embodiments, the frequency determination unit 432 may determine the frequency threshold based on a frequency response curve associated with the bone conduction audio data. The frequency response curve associated with the bone conduction audio data may include frequency response values varied according to frequency. In some embodiments, the frequency determination unit 432 may determine the one or more frequency thresholds based on the frequency response values of the frequency response curve associated with the bone conduction audio data. In some embodiments, the frequency determination unit 432 may determine the one or more frequency thresholds based on a change of the frequency response curve. In some embodiments, the frequency determination unit 432 may determine a frequency response curve associated with reconstructed bone conduction audio data. In some embodiments, the frequency determination unit 432 may determine one or more frequency thresholds based on a noise level associated with at least a portion of the air conduction audio data. In some embodiments, the noise level may be denoted by a signal to noise ratio (SNR) of the air conduction audio data. The greater the SNR is, the lower the noise level may be. The greater the SNR associated with the air conduction audio data is, the greater a frequency threshold may be.

The weight determination unit 434 may be configured to divide each of the bone conduction audio data and the air conduction audio data into multiple segments according to the one or more frequency thresholds. Each segment of the bone conduction audio data may correspond to one segment of the air conduction audio data. As used herein, a segment of the bone conduction audio data corresponding to a segment of the air conduction audio data may refer to that the two segments of the bone conduction audio data and the air conduction audio data is defined by one or two same frequency thresholds. In some embodiments, a count or number of the one or more frequency thresholds may be one, the weight determination unit 434 may divide each of the bone conduction audio data and the air conduction audio data into two segments.

The weight determination unit 434 may be also configured to determine a weight for each of the multiple segments of each of the bone conduction audio data and the air conduction audio data. In some embodiments, a weight for a specific segment of the bone conduction audio data and a weight for the corresponding specific segment of the air conduction audio data may satisfy a criterion such that the sum of the weight for the specific segment of the bone conduction audio data and the weight for the corresponding specific segment of the air conduction audio data is equal to 1. In some embodiments, the weight determination unit 434 may determine weights for different segments of the bone conduction audio data or the air conduction audio data based on the SNR of the air conduction audio data.

The combination unit 436 may be configured to stitch, fuse, and/or combine the bone conduction audio data and the air conduction audio data based on the weight for each of the multiple segments of each of the bone conduction audio data and the air conduction audio data to generate stitched, combined, and/or fused audio data. In some embodiments, the combination unit 436 may determine a lower portion of the bone conduction audio data and a higher portion of the air conduction audio data according to the one single frequency threshold. The combination unit 436 may stitch and/or combine the lower portion of the bone conduction audio data and the higher portion of the air conduction audio data to generate stitched audio data. The combination unit 436 may determine the lower portion of the bone conduction audio data and the higher portion of the air conduction audio data based on one or more filters. In some embodiments, the combination unit 436 may determine the stitched, combined, and/or fused audio data by weighting the lower portion of the bone conduction audio data, the higher portion of the bone conduction audio data, the lower portion of the air conduction audio data, and the higher portion of the air conduction audio data, using a first weight, a second weight, a third weight, and a fourth weight, respectively. In some embodiments, the combination unit 436 may determine combined, and/or fused audio data by weighting the bone conduction audio data and the air conduction audio data using the weight for the bone conduction audio data and the weight for the air conduction audio data, respectively.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, the audio data generation module 430 may further include an audio data dividing sub-module (not shown in FIG. 4B). The audio data dividing sub-module may be configured to divide each of the bone conduction audio data and the air conduction audio data into multiple segments according to the one or more frequency thresholds. As another example, the weight determination unit 434 and the combination unit 436 may be integrated into one module.

Figure 5:
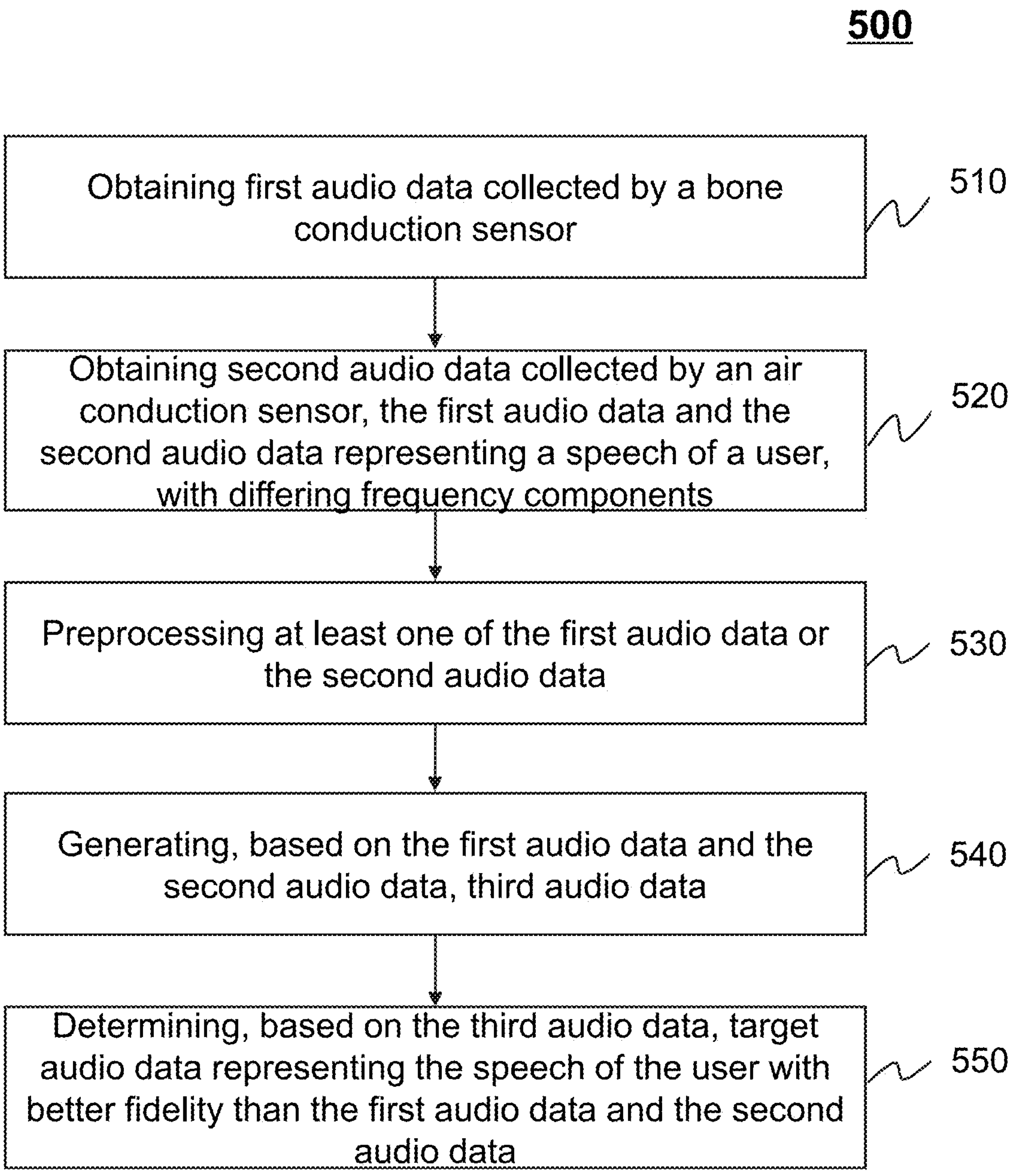
FIG. 5 is a schematic flowchart illustrating an exemplary process for generating an audio signal according to some embodiments of the present disclosure.

FIG. 5 is a schematic flowchart illustrating an exemplary process for generating an audio signal according to some embodiments of the present disclosure. In some embodiments, a process 500 may be implemented as a set of instructions (e.g., an application) stored in the storage device 140, ROM 230 or RAM 240, or storage 390. The processing device 122, the processor 220, and/or the CPU 340 may execute the set of instructions, and when executing the instructions, the processing device 122, the processor 220, and/or the CPU 340 may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process 500 illustrated in FIG. 5 and described below is not intended to be limiting.

In 510, the processing device 122 (e.g., the obtaining module 410) may obtain first audio data collected by a bone conduction sensor. As used herein, the bone conduction sensor may refer to any sensor (e.g., the bone conduction microphone 112) that may collect vibration signals conducted through the bone (e.g., the skull) of a user generated when the user speaks as described elsewhere in the present disclosure (e.g., FIG. 1 and the descriptions thereof). The vibration signals collected by the bone conduction sensor may be converted into audio data (e.g., audio signals) by the bone conduction sensor or any other device (e.g., an amplifier, an analog-to-digital converter (ADC), etc.). The audio data (e.g., the first audio data) collected by the bone conduction sensor may be also referred to as bone conduction audio data. In some embodiments, the first audio data may include an audio signal in a time domain, an audio signal in a frequency domain, etc. The first audio data may include an analog signal or a digital signal. In some embodiments, the processing device 122 may obtain the first audio data from the bone conduction sensor (e.g., the bone conduction microphone 112), the terminal 130, the storage device 140, or any other storage device via the network 150 in real time or periodically.

The first audio data may be represented by a superposition of multiple waves (e.g., sine waves, harmonic waves, etc.) with different frequencies and/or intensities (i.e., amplitudes). As used herein, a wave with a specific frequency may also be referred to as a frequency component with the specific frequency. In some embodiments, the frequency components included in the first audio data collected by the bone conduction sensor may be in a frequency range from 0 Hz to 20 kHz, or from 20 Hz to 10 kHz, or from 20 Hz to 4000 Hz, or from 20 Hz to 3000 Hz, or from 1000 Hz to 3500 Hz, or from 1000 Hz to 3000 Hz, or from 1500 Hz to 3000 Hz, etc. The first audio data may be collected and/or generated by the bone conduction sensor when a user speaks. The first audio data may represent what the user speaks, i.e., the speech of the user. For example, the first audio data may include acoustic characteristics and/or semantic information that may reflect the content of the speech of the user. The acoustic characteristics of the first audio data may include one or more features associated with duration, one or more features associated with energy, one or more features associated with fundamental frequency, one or more features associated with frequency spectrum, one or more features associated with phase spectrum, etc. A feature associated with duration may also be referred to as a duration feature. Exemplary duration features may include a speaking speed, a short time average zero-over rate, etc. A feature associated with energy may also be referred to as an energy or amplitude feature. Exemplary energy or amplitude features may include a short time average energy, a short time average amplitude, a short time energy gradient, an average amplitude change rate, a short time maximum amplitude, etc. A feature associated with fundamental frequency may be also referred to as a fundamental frequency feature. Exemplary fundamental frequency features may include a fundamental frequency, a pitch of the fundamental frequency, an average fundamental frequency, a maximum fundamental frequency, a fundamental frequency range, etc. Exemplary features associated with frequency spectrum may include formant features, linear prediction cepstrum coefficients (LPCC), mel-frequency cepstrum coefficients (MFCC), etc. Exemplary features associated with phase spectrum may include an instantaneous phase, an initial phase, etc.

In some embodiments, the first audio data may be collected and/or generated by positioning the bone conduction sensor at a region of the user's body and/or putting the bone conduction sensor in contact with the skin of the user. The regions of the user's body in contact with the bone conduction sensor for collecting the first audio data may include but not limited to the forehead, the neck (e.g., the throat), a mastoid, an area around an ear or inside of the ear, a temple, the face (e.g., an area around the mouth, the chin), the top of the head, etc. For example, the bone conduction microphone 112 may be positioned at and/or contact with the ear screen, the auricle, the inner auditory meatus, the external auditory meatus, etc. In some embodiments, the first audio data may be different according to different regions of the user's body in contact with the bone conduction sensor. For example, different regions of the user's body in contact with the bone conduction sensor may cause the frequency components, acoustic characteristics of the first audio data (e.g., an amplitude of a frequency component), noises included in the first audio data, etc., to vary. For example, the signal intensity of the first audio data collected by a bone conduction sensor located at the neck is greater than the signal intensity of the first audio data collected by a bone conduction sensor located at the tragus, and the signal intensity of the first audio data collected by the bone conduction sensor located at the tragus is greater than the signal intensity of the first audio data collected by a bone conduction sensor located at the auditory meatus. As a further example, bone conduction audio data collected by a first bone conduction sensor positioned at a region around an ear of a user may include more frequency components than bone conduction audio data collected simultaneously by a second bone conduction sensor with the same configuration but positioned at the top of the head of the user. In some embodiments, the first audio data may be collected by the bone conduction sensor located at a region of the user's body with a specific pressure applied by the bone conduction sensor in a range, such as 0 Newton to 1 Newton, or 0 Newton to 0.8 Newton, etc. For example, the first audio data may be collected by the bone conduction sensor located at a tragus of the user's body with a specific pressure 0 Newton, or 0.2 Newton, or 0.4 Newton, or 0.8 Newton, etc., applied by the bone conduction sensor. Different pressures on a same region of the user's body exerted by the bone conduction sensor may cause the frequency components, acoustic characteristics of the first audio data (e.g., an amplitude of a frequency component), noises included in the first audio data, etc., to vary. For example, the signal intensity of the bone conduction audio data may increase gradually at first and then the increase of the signal intensity may slow down to saturation when the pressure increases from 0N to 0.8N. More descriptions for effects of different body regions in contact with the bone conduction sensor on bone conduction audio data may be found elsewhere in the present disclosure (e.g., FIG. 12A and the descriptions thereof). More descriptions for effects of different pressures applied by a bone conduction audio data for bone conduction audio data may be found elsewhere in the present disclosure (e.g., FIG. 12B and the descriptions thereof).

In 520, the processing device 122 (e.g., the obtaining module 410) may obtain second audio data collected by an air conduction sensor. The air conduction sensor used herein may refer to any sensor (e.g., the air conduction microphone 114) that may collect vibration signals conducted through the air when a user speaks as described elsewhere in the present disclosure (e.g., FIG. 1 and the descriptions thereof). The vibration signals collected by the air conduction sensor may be converted into audio data (e.g., audio signals) by the air conduction sensor or any other device (e.g., an amplifier, an analog-to-digital converter (ADC), etc.). The audio data (e.g., the second audio data) collected by the air conduction sensor may be also referred to as air conduction audio data. In some embodiments, the second audio data may include an audio signal in a time domain, an audio signal in a frequency domain, etc. The second audio data may include an analog signal or a digital signal. In some embodiments, the processing device 122 may obtain the second audio data from the air conduction sensor (e.g., the air conduction microphone 114), the terminal 130, the storage device 140, or any other storage device via the network 150 in real time or periodically. In some embodiments, the second audio data may be collected by positioning the air conduction sensor within a distance threshold (e.g., 0 cm, 1 cm, 2 cm, 5 cm, 10 cm, 20 cm, etc.) from the mouth of the user. In some embodiments, the second audio data (e.g., an average amplitude of the second audio data) may be different according to different distances between the air conduction sensor and the mouth of the user.

The second audio data may be represented by a superposition of multiple waves (e.g., sine waves, harmonic waves, etc.) with different frequencies and/or intensities (i.e., amplitudes). In some embodiments, the frequency components included in the second audio data collected by the air conduction sensor may be in a frequency range from 0 Hz to 20 kHz, or from 20 Hz to 20 kHz, or from 1000 Hz to 10 kHz, etc. The second audio data may be collected and/or generated by the air conduction audio data when a user speaks. The second audio data may represent what the user speaks, i.e., the speech of the user. For example, the second audio data may include acoustic characteristics and/or semantic information that may reflect the content of the speech of the user. The acoustic characteristics of the second audio data may include one or more features associated with duration, one or more features associated with energy, one or more features associated with fundamental frequency, one or more features associated with frequency spectrum, one or more features associated with phase spectrum, etc., as described in operation 510.

In some embodiments, the first audio data and the second audio data may represent a same speech of a user with differing frequency components. The first audio data and the second audio data representing the same speech of the user may refer to that the first audio data and the second audio data are simultaneously collected by the bone conduction sensor and the air conduction sensor, respectively when the user makes the speech. In some embodiments, the first audio data collected by the bone conduction sensor may include first frequency components. The second audio data may include second frequency components. In some embodiments, the second frequency components of the second audio data may include at least a portion of the first frequency components. The semantic information included in the second audio data may be the same as or different from the semantic information included in the first audio data. An acoustic characteristic of the second audio data may be the same as or different from the acoustic characteristic of the first audio data. For example, an amplitude of a specific frequency component of the first audio data may be different from an amplitude of the specific frequency component of the second audio data. As another example, frequency components of the first audio data less than a frequency point (e.g., 2000 Hz) or in a frequency range (e.g., 20 Hz to 2000 Hz) may be more than frequency components of the second audio data less than the frequency point (e.g., 2000 Hz) or in the frequency range (e.g., 20 Hz to 2000 Hz). Frequency components of the first audio data greater than a frequency point (e.g., 3000 Hz) or in a frequency range (e.g., 3000 Hz to 20 kHz) may be less than frequency components of the second audio data greater than the frequency point (e.g., 3000 Hz) or in a frequency range (e.g., 3000 Hz to 20 kHz). As used herein, frequency components of the first audio data less than a frequency point (e.g., 2000 Hz) or in a frequency range (e.g., 20 Hz to 2000 Hz) more than frequency components of the second audio data less than the frequency point (e.g., 2000 Hz) or in the frequency range (e.g., 20 Hz to 2000 Hz) may refer to that a count or number of the frequency components of the first audio data less than a frequency point (e.g., 2000 Hz) or in a frequency range (e.g., 20 Hz to 2000 Hz) are greater than the count or number of frequency components of the second audio data less than the frequency point (e.g., 2000 Hz) or in the frequency range (e.g., 20 Hz to 2000 Hz).

In 530, the processing device 122 (e.g., the preprocessing module 420) may preprocess at least one of the first audio data or the second audio data. The first audio data and the second audio data after being preprocessed may be also referred to as preprocessed first audio data and preprocessed second audio data, respectively. Exemplary preprocessing operations may include a domain transform operation, a signal calibration operation, an audio reconstruction operation, a speech enhancement operation, etc.

The domain transform operation may be performed to convert the first audio data and/or the second audio data from a time domain to a frequency domain or from the frequency domain to the time domain. In some embodiments, the processing device 122 may perform the domain transform operation by performing a Fourier transform or an inverse Fourier transform. In some embodiments, for performing the domain transform operation, the processing device 122 may perform a frame-dividing operation, a windowing operation, etc., on the first audio data and/or the second audio data. For example, the first audio data may be divided into one or more speech frames. Each of the one or more speech frames may include audio data for a duration of time (e.g., 5 ms, 10 ms, 15 ms, 20 ms, 25 ms, etc.), in which the audio data may be considered to be approximately stable. Each of the one or more speech frames may be performed a windowing operation using a function of a wave segmentation to obtain a processed speech frame. As used herein, the function of the wave segmentation may be referred to as a window function. Exemplary window functions may include a Hamming window, a Hann window, a Blackman-Harris window, etc. Finally, a Fourier transform operation may be used to convert the first audio data from the time domain to the frequency domain based on the processed speech frame.

The signal calibration operation may be used to unify orders of magnitude of the first audio data and the second audio data (e.g., an amplitude) to remove a difference between orders of magnitude of the first audio data and/or the second audio data caused by for example, a sensitivity difference between the bone conduction sensor and the air conduction sensor. In some embodiments, the processing device 122 may perform a normalization operation on the first audio data and/or the second audio data to obtain normalized first audio data and/or normalized second audio data for calibrating the first audio data and/or the second audio data. For example, the processing device 122 may determine the normalized first audio data and/or the normalized second audio data according to Equation (1) as follows:

$$S_{normalized} = \frac{S_{initial}}{|S_{max}|}, \tag{1}$$

where $S_{normalized}$ refers to the normalized first audio data (or the normalized second audio data), $S_{initial}$ refers to the first audio data (or the second audio data), $|S_{max}|$ may represent a maximum value among absolute values of amplitudes of the first audio data (or the second audio data).

The speech enhancement operation may be used to reduce noises or other extraneous and undesirable information included in audio data (e.g., the first audio data and/or the second audio data). The speech enhancement operation performed on the first audio data (or the normalized first audio data) and/or the second audio data (or the normalized second audio data) may include using a speech enhancement algorithm based on spectral subtraction, a speech enhancement algorithm based on wavelet analysis, a speech enhancement algorithm based on Kalman filter, a speech enhancement algorithm based on signal subspace, a speech enhancement algorithm based on auditory masking effect, a speech enhancement algorithm based on independent component analysis, a neural network technique, or the like, or a combination thereof. In some embodiments, the speech enhancement operation may include a denoising operation. In some embodiments, the processing device 122 may perform a denoising operation on the second audio data (or the normalized second audio data) to obtain denoised second audio data. In some embodiments, the normalized second audio data and/or the denoised second audio data may also be referred to as preprocessed second audio data. In some embodiments, the denoising operation may include using a wiener filter, a spectral subtraction algorithm, an adaptive algorithm, a minimum mean square error (MMSE) estimation algorithm, or the like, or any combination thereof.

The audio reconstruction operation may be used to emphasize or increase frequency components of interest greater than a frequency point (e.g., 2000 Hz, 3000 Hz) or in a frequency range (e.g., 2000 Hz to 20 kHz, 3000 Hz to 20 kHz,) of initial bone conduction audio data (e.g., the first audio data or the normalized first audio data) to obtain reconstructed bone conduction audio data with improved fidelity with respect to the initial bone conduction audio data (e.g., the first audio data or the normalized first audio data). The reconstructed bone conduction audio data may be similar, close, or identical to ideal air conduction audio data with no or less noise collected by an air conduction sensor at the same time when the initial bone conduction audio data is collected and represent a same speech of a user with the initial bone conduction audio data. The reconstructed bone conduction audio data may be equivalent to air conduction audio data, which may be also referred to as equivalent air conduction audio data corresponding to the initial bone conduction audio data. As used herein, the reconstructed audio data similar, close, or identical to the ideal air conduction audio data may refer to that a similarity degree between the reconstructed bone audio data and the ideal air conduction audio data may be greater than a threshold (e.g., 90%, 80%, 70%, etc.). More descriptions for the reconstructed bone conduction audio data, the initial bone conduction audio data, and the ideal air conduction audio data may be found elsewhere in the present disclosure (e.g., FIG. 11 and the descriptions thereof).

In some embodiments, the processing device 122 may perform the audio reconstruction operation on the first audio data (or the normalized first audio data) to generate reconstructed first audio data using a trained machine learning model, a constructed filer, a harmonic correction model, a sparse matrix technique, or the like, or any combination thereof. In some embodiments, the reconstructed first audio data may be generated using one of the trained machine learning model, a constructed filer, a harmonic correction model, a sparse matrix technique, etc. In some embodiments, the reconstructed first audio data may be generated using at least two of the trained machine learning model, a constructed filer, a harmonic correction model, a sparse matrix technique, etc. For example, the processing device 122 may generate an intermediate first audio data by reconstructing the first audio data using the trained machine learning model. The processing device 122 may generate the reconstructed first audio data by reconstructing the intermediate first audio data using one of the constructed filer, the harmonic correction model, the sparse matrix technique, etc. As another example, the processing device 122 may generate an intermediate first audio data by reconstructing the first audio data using one of the constructed filer, the harmonic correction model, the sparse matrix technique. The processing device 122 may generate another intermediate first audio data by reconstructing the first audio data using another one of the constructed filer, the harmonic correction model, the sparse matrix technique, etc. The processing device 122 may generate the reconstructed first audio data by averaging the intermediate first audio data and the another intermediate first audio data. As a further example, the processing device 122 may generate a plurality of intermediate first audio data by reconstructing the first audio data using two or more of the constructed filer, the harmonic correction model, the sparse matrix technique, etc. The processing device 122 may generate the reconstructed first audio data by averaging the plurality of intermediate first audio data.

In some embodiments, the processing device 122 may reconstruct the first audio data (or the normalized first audio data) to obtain the reconstructed first audio data using a trained machine learning model. Frequency components higher than a frequency point (e.g., 2000 Hz, 3000 Hz) or in a frequency range (e.g., 2000 Hz to 20 kHz, 3000 Hz to 20 kHz, etc.) of the reconstructed first audio data may increase with respect to frequency components of the first audio data higher than the frequency point (e.g., 2000 Hz, 3000 Hz) or in the frequency range (e.g., 2000 Hz to 20 kHz, 3000 Hz to 20 kHz, etc.). The trained machine learning model may be constructed based on a deep learning model, a traditional machine learning model, or the like, or any combination thereof. Exemplary deep learning models may include a convolutional neural network (CNN) model, a recurrent neural network (RNN) model, a long short-term memory network (LSTM) model, etc. Exemplary traditional machine learning models may include a hidden markov model (HMM), a multilayer perceptron (MLP) model, etc.

In some embodiments, the trained machine learning model may be determined by training a preliminary machine learning model using a plurality of groups of training data. Each group of the plurality of groups of training data may include bone conduction audio data and air conduction audio data. A group of training data may also be referred to as a speech sample. The bone conduction audio data in a speech sample may be used as an input of the preliminary machine learning model and the air conduction audio data corresponding to the bone conduction audio data in the speech sample may be used as a desired output of the preliminary machine learning model during a training process of the preliminary machine learning model. The bone conduction audio data and the air conduction audio data in a speech sample may represent a same speech and be collected respectively by a bone conduction sensor and an air conduction sensor simultaneously in a noise-free environment. As used herein, the noise-free environment may refer to that one or more noise evaluation parameters (e.g., the noise standard curve, a statistical noise level, etc.) in the environment satisfy a condition, such as less than a threshold. The trained machine learning model may be configured to provide a corresponding relationship between bone conduction audio data (e.g., the first audio data) and reconstructed bone conduction audio data (e.g., equivalent air conduction audio data). The trained machine learning model may be configured to reconstruct the bone conduction audio data based on the corresponding relationship. In some embodiments, the bone conduction audio data in each of the plurality of groups of training data may be collected by a bone conduction sensor positioned at a same region (e.g., the area around an ear) of the body of a user (e.g., a tester). In some embodiments, the region of the body where a bone conduction sensor is positioned for collecting the bone conduction audio data used for the training of the trained machine learning model may be consistent with and/or the same as the region of the body where the bone conduction sensor is positioned for collecting bone conduction audio data (e.g., the first audio data) used for application of the trained machine learning model. For example, the region of the body of a user (e.g., a tester) where the bone conduction sensor is positioned for collecting the bone conduction audio data in each group of the plurality of groups of training data may be the same as a region of the body of the user where the bone conduction sensor is positioned for collecting the first audio data. As a further example, if a region of the body of the user where the bone conduction sensor is positioned for collecting the first audio data is the neck, a region of a body where a bone conduction sensor is positioned for collecting the bone conduction audio data used in the training process of the trained machine learning model is the neck of the body. The region of the body of a user (e.g., a tester) where the bone conduction sensor is positioned for collecting the plurality of groups of training data may affect the corresponding relationship between the bone conduction audio data (e.g., the first audio data) and the reconstructed bone conduction audio data (e.g., equivalent air conduction audio data), thus affecting the reconstructed bone conduction audio data generated based on the corresponding relationship using the trained machine learning model. Corresponding relationships between the bone conduction audio data (e.g., the first audio data) and the reconstructed bone conduction audio data (e.g., equivalent air conduction audio data) when the plurality of groups of training data collected by the bone conduction sensor located at different regions are used for the training of the trained machine learning model. For example, multiple bone conduction sensors in the same configuration may be located at different regions of a body, such as the mastoid, a temple, the top of the head, the external auditory meatus, etc. The multiple bone conduction sensors may simultaneously collect bone conduction audio data when the user speaks. Multiple training sets may be formed based on the bone conduction audio data collected by the multiple bone conduction sensors. Each of the multiple training sets may include a plurality of groups of training data collected by one of the multiple bone conduction sensors and an air conduction sensor. Each of the plurality of groups of training data may include bone conduction audio data and air conduction audio data representing a same speech. Each of the multiple training sets may be used to train a machine learning model to obtain a trained machine learning model. Multiple trained machine learning models may be obtained based on the multiple training sets. The multiple trained machine learning models may provide different corresponding relationships between specific bone conduction audio data and reconstructed bone conduction audio data. For example, different reconstructed bone conduction audio data may be generated by inputting the same bone conduction audio data into multiple trained machine learning models respectively. In some embodiments, bone conduction audio data (e.g., frequency response curves of) collected by different bone conduction sensors in the configuration may be different. Therefore, the bone conduction sensor for collecting the bone conduction audio data used for the training of the trained machine learning model may be consistent with and/or the same as the bone conduction sensor for collecting bone conduction audio data (e.g., the first audio data) used for application of the trained machine learning model in the configuration. In some embodiments, bone conduction audio data (e.g., frequency response curves) collected by a bone conduction sensor located at a region of the user's body with different pressures in a range, such as 0 Newton to 1 Newton, or 0 Newton to 0.8 Newton, etc., may be different. Therefore, the pressure that the bone conduction sensor applies to a region of a user's body for collecting the bone conduction audio data for the training of the trained machine learning model may be consistent with and/or same as the pressure that the bone conduction sensor applies to a region of a user's body for collecting the bone conduction audio data for application of the trained machine learning model in the configuration. More descriptions for determining the trained machine learning model and/or reconstructing bone conduction audio data may be found in FIG. 6 and the descriptions thereof.

In some embodiments, the processing device 122 (e.g., the preprocessing module 420) may reconstruct the first audio data (or the normalized first audio data) to obtain the reconstructed bone conduction audio data using a constructed filter. The constructed filter may be configured to provide a relationship between specific air conduction audio data and specific bone conduction audio data corresponding to the specific air conduction audio data. As used herein, corresponding bone conduction audio data and air conduction audio data may refer to that the corresponding bone conduction audio data and air conduction audio data represent a same speech of a user. The specific air conduction audio data may be also referred to as equivalent air conduction audio data or reconstructed bone conduction audio data corresponding to the specific bone conduction audio data. Frequency components of the specific air conduction audio data higher than a frequency point (e.g., 2000 Hz, 3000 Hz) or in a frequency range (e.g., 2000 Hz to 20 kHz, 3000 Hz to 20 kHz, etc.) may be more than frequency components of the specific bone conduction audio data higher than the frequency point (e.g., 2000 Hz, 3000 Hz) or in the frequency range (e.g., 2000 Hz to 20 kHz, 3000 Hz to 20 kHz, etc.). The processing device 122 may convert the specific bone conduction audio data into the specific air conduction audio data based on the relationship. For example, the processing device 122 may obtain the reconstructed first audio data using the constructed filter to convert the first audio data into the reconstructed first audio data. In some embodiments, bone conduction audio data in a speech sample may be denoted as d(n), and corresponding air conduction data in the speech sample may be denoted as s(n). The bone conduction audio data d(n), and the corresponding air conduction audio data s(n) may be determined based on initial sound excitation signals e(n) through a bone conduction system and an air conduction system respectively which may be equivalent to a filter B and filter V, respectively. Then the constructed filter may be equivalent to a filter H. The filter H may be determined according to Equation (2) as follows:

$$H = \frac{V}{B} = \frac{s(n)}{d(n)}. \tag{2}$$

In some embodiments, the constructed filter may be determined using, for example, a long-term spectrum technique. For example, the processing device 122 may determine a constructed filter according to Equation (3) as follows:

$$\hat{H}(f) = \frac{\overline{S}(f)}{\overline{D}(f)}, \tag{3}$$

where $\hat{H}(f)$ refers to the constructed filer in a frequency domain, $\overline{S}(f)$ refers to a long-term spectrum expression corresponding to the air conduction audio data s(n), $\overline{D}(f)$ refers to a long-term spectrum expression corresponding to the bone conduction audio data d(n). In some embodiments, the processing device 122 may obtain one or more groups of corresponding bone conduction audio data and air conduction audio data (also referred to as speech samples), each of which is collected respectively by a bone conduction sensor and an air conduction sensor simultaneously in a noise-free environment when an operator (e.g., a tester) speaks. The processing device 122 may determine the constructed filter based on the one or more groups of corresponding bone conduction audio data and air conduction audio data according to Equation (3). For example, the processing device 122 may determine a candidate constructed filter based on each of the one or more groups of corresponding bone conduction audio data and air conduction audio data according to Equation (3). The processing device 122 may determine the constructed filter based on candidate constructed filters corresponding to the one or more groups of corresponding bone conduction audio data and air conduction audio data. In some embodiments, the processing device 122 may perform an inverse Fourier transform (IFT) (e.g., fast IFT) operation on the initial filter $\hat{H}(f)$ to obtain the constructed filter in a time domain.

In some embodiments, the region of the body where a bone conduction sensor is positioned for collecting the bone conduction audio data used for determining the constructed filter may be consistent with and/or same as the region of the body where the bone conduction sensor is positioned for collecting bone conduction audio data (e.g., the first audio data) used for application of the constructed filter. For example, the region of the body of a user (e.g., a tester) where the bone conduction sensor is positioned for collecting the bone conduction audio data in each group of the one or more groups of corresponding bone conduction audio data and air conduction audio data may be same as a region of the body of the user where the bone conduction sensor is positioned for collecting the first audio data. In some embodiments, the constructed filter may be different as the regions of the body where a bone conduction sensor is positioned for collecting the bone conduction audio data used for determining the constructed filter. For example, one or more first groups of corresponding bone conduction audio data and air conduction audio data collected by a first bone conduction sensor located at a first region of a body and an air conduction sensor, respectively, when a user speaks may be obtained. One or more second groups of corresponding bone conduction audio data and air conduction audio data collected by a second bone conduction sensor located at a second region of the body and the air conduction sensor, respectively when the user speaks may be obtained. A first constructed filter may be determined based on the one or more first groups of corresponding bone conduction audio data and air conduction audio data. A second constructed filter may be determined based on the one or more second groups of corresponding bone conduction audio data and air conduction audio data. The first constructed filter may be different from the second constructed filter. Reconstructed bone conduction audio data determined, respectively based on the first constructed filter and the second constructed filter may be different based on same bone conduction audio data (e.g., the first audio data). The relationships between specific air conduction audio data and specific bone conduction audio data corresponding to the specific air conduction audio data provided by the first constructed filter and the second constructed filter may be different.

In some embodiments, the processing device 122 (e.g., the preprocessing module 420) may reconstruct the first audio data (or the normalized first audio data) to obtain the reconstructed first audio data using a harmonic correction model. The harmonic correction model may be configured to provide a relationship between an amplitude spectrum of specific air conduction audio data and an amplitude spectrum of specific bone conduction audio data corresponding to the specific air conduction audio data. As used herein, the specific air conduction audio data may be also referred to as equivalent air conduction audio data or reconstructed bone conduction audio data corresponding to the specific bone conduction audio data. The amplitude spectrum of the specific air conduction audio data may be also referred to as a corrected amplitude spectrum of the specific bone conduction audio data. The processing device 122 may determine an amplitude spectrum and a phase spectrum of the first audio data (or the normalized first audio data) in the frequency domain. The processing device 122 may correct the amplitude spectrum of the first audio data (or the normalized first audio data) using the harmonic correction model to obtain a corrected amplitude spectrum of the first audio data (or the normalized first audio data). Then the processing device 122 may determine the reconstructed first audio data based on the corrected amplitude spectrum and the phase spectrum of the first audio data (or the normalized first audio data). More descriptions for reconstructing the first audio data using a harmonic correction model may be found elsewhere in the present disclosure (e.g., FIG. 7 and the descriptions thereof).

In some embodiments, the processing device 122 (e.g., the preprocessing module 420) may reconstruct the first audio data (or the normalized first audio data) to obtain the reconstructed first audio data using a sparse matrix technique. For example, the processing device 122 may obtain a first transform relationship configured to convert a dictionary matrix of initial bone conduction audio data (e.g., the first audio data) to a dictionary matrix of reconstructed bone conduction audio data (e.g., the reconstructed first audio data) corresponding to the initial bone conduction audio data. The processing device 122 may obtain a second transform relationship configured to convert a sparse code matrix of the initial bone conduction audio data to a sparse code matrix of the reconstructed bone conduction audio data corresponding to the initial bone conduction audio data. The processing device 122 may determine a dictionary matrix of the reconstructed first audio data based on a dictionary matrix of the first audio data using the first transform relationship. The processing device 122 may determine a sparse code matrix of the reconstructed first audio data based on a sparse code matrix of the first audio data using the second transform relationship. The processing device 122 may determine the reconstructed first audio data based on the determined dictionary matrix and the determined sparse code matrix of the reconstructed first audio data. In some embodiments, the first transform relationship and/or the second transform relationship may be default settings of the audio signal generation system 100. In some embodiments, the processing device 122 may determine the first transform relationship and/or the second transform relationship based on one or more groups of bone conduction audio data and corresponding air conduction audio data. More descriptions for reconstructing the first audio data using a sparse matrix technique may be found elsewhere in the present disclosure (e.g., FIG. 8 and the descriptions thereof).

In 540, the processing device 122 (e.g., the audio data generation module 430) may generate third audio data based on the first audio data (or the preprocessed first audio data) and the second audio data (or the preprocessed second audio data). Frequency components of the third audio data higher than a frequency point (or threshold) may increase with respect to frequency components of the first audio data (or the preprocessed first audio data) higher than the frequency point (or threshold). In other words, the frequency components of the third audio data higher than the frequency point (or threshold) may be more than the frequency components of the first audio data (or the preprocessed first audio data) higher than the frequency point (or threshold). In some embodiments, a noise level associated with the third audio data may be lower than a noise level associated with the second audio data (or the preprocessed second audio data). As used herein, the frequency components of the third audio data higher than the frequency point (or threshold) increasing with respect to the frequency components of the first audio data (or the preprocessed first audio data) higher than the frequency point may refer to that a count or number of waves with frequencies higher than the frequency point in the third audio data may be greater than a count or number of waves with frequencies higher than the frequency point in the first audio data. In some embodiments, the frequency point may be a constant in a range from 20 Hz to 20 kHz. For example, the frequency point may be 2000 Hz, 3000 Hz, 4000 Hz, 5000 Hz, 6000 Hz, etc. In some embodiments, the frequency point may be a frequency value of frequency components in the third audio data and/or the first audio data.

In some embodiments, the processing device 122 may generate the third audio data based on the first audio data (or the preprocessed first audio data) and the second audio data (or the preprocessed second audio data) according to one or more frequency thresholds. For example, the processing device 122 may determine the one or more frequency thresholds at least in part based on at least one of the first audio data (or the preprocessed first audio data) or the second audio data (or the preprocessed second audio data). The processing device 122 may divide the first audio data (or the preprocessed first audio data) and the second audio data (or the preprocessed second audio data), respectively into multiple segments according to the one or more frequency thresholds. The processing device 122 may determine a weight for each of the multiple segments of each of the first audio data (or the preprocessed first audio data) and the second audio data (or the preprocessed second audio data). Then the processing device 122 may determine the third audio data based on the weight for each of the multiple segments of each of the first audio data (or the preprocessed first audio data) and the second audio data (or the preprocessed second audio data).

In some embodiments, the processing device 122 may determine one single frequency threshold. The processing device 122 may stitch the first audio data (or the preprocessed first audio data) and the second audio data (or the preprocessed second audio data) in a frequency domain according to the one single frequency threshold to generate the third audio data. For example, the processing device 122 may determine a lower portion of the first audio data (or the preprocessed first audio data) including frequency components lower than the one single frequency threshold using a first specific filter. The processing device 122 may determine a higher portion of the second audio data (or the preprocessed second audio data) including frequency components higher than the one single frequency threshold using a second specific filter. The processing device 122 may stitch and/or combine the lower portion of the first audio data (or the preprocessed first audio data) and the higher portion of the second audio data (or the preprocessed second audio data) to generate the third audio data. In some embodiments, the first specific filter may be a low-pass filter with the one single frequency threshold as a cut-off frequency that may allow frequency components in the first audio data lower than the one single frequency threshold to pass through. The second specific filter may be a high-pass filter with the one single frequency threshold as a cut-off frequency that may allow frequency components in the second audio data higher than the one single frequency threshold to pass through. In some embodiments, the processing device 122 may determine the one single frequency threshold at least in part based on the first audio data (or the preprocessed first audio data) and/or the second audio data (or the preprocessed second audio data). More descriptions for determining the one single frequency threshold may be found in FIG. 9 and the descriptions thereof.

In some embodiments, the processing device 122 may determine, at least in part based on the one single frequency threshold, a first weight and a second weight for the lower portion of the first audio data (or the preprocessed first audio data) and the higher portion of the first audio data (or the preprocessed first audio data), respectively. The processing device 122 may determine, at least in part based on the one single frequency threshold, a third weight and a fourth weight for the lower portion of the second audio data (or the preprocessed second audio data) and the higher portion of the second audio data (or the preprocessed second audio data), respectively. In some embodiments, the processing device 122 may determine the third audio data by weighting the lower portion of the first audio data (or the preprocessed first audio data), the higher portion of the first audio data (or the preprocessed first audio data), the lower portion of the second audio data (or the preprocessed second audio data), the higher portion of the second audio data (or the preprocessed second audio data) using the first weight, the second weight, the third weight, and the fourth weight, respectively. More descriptions for determining the third audio data (or the stitched audio data) may be found in FIG. 9 and the descriptions thereof.

In some embodiments, the processing device 122 may determine a weight corresponding to the first audio data (or the preprocessed first audio data) and a weight corresponding to the second audio data (or the preprocessed second audio data) at least in part based on at least one of the first audio data (or the preprocessed first audio data) or the second audio data (or the preprocessed second audio data). The processing device 122 may determine the third audio data by weighting the first audio data (or the preprocessed first audio data) and the second audio data (or the preprocessed second audio data) using the weight corresponding to the first audio data (or the preprocessed first audio data) and the weight corresponding to the second audio data (or the preprocessed second audio data). More descriptions for determining the third audio data may be found elsewhere in the present disclosure (e.g., FIG. 10 and the descriptions thereof).

In 550, the processing device 122 (e.g., the audio data generation module 430) may determine, based on the third audio data, target audio data representing the speech of the user with better fidelity than the first audio data and the second audio data. The target audio data may represent the speech of the user which the first audio data and the second audio data represent. As used herein, the fidelity may be used to denote a similarity degree between output audio data (e.g., the target audio data, the first audio data, the second audio data) with original input audio data (e.g., the speech of the user). The fidelity may be used to denote the intelligibility of the output audio data (e.g., the target audio data, the first audio data, the second audio data).

In some embodiments, the processing device 122 may designate the third audio data as the target audio data. In some embodiments, the processing device 122 may perform a post-processing operation on the third audio data to obtain the target audio data. In some embodiments, the post-processing operation may include a denoising operation, a domain transform operation (e.g., a Fourier transform (FT) operation), or the like, or the combination thereof. In some embodiments, the denoising operation performed on the third audio data may include using a wiener filter, a spectral subtraction algorithm, an adaptive algorithm, a minimum mean square error (MMSE) estimation algorithm, or the like, or any combination thereof. In some embodiments, the denoising operation performed on the third audio data may be the same as or different from the denoising operation performed on the second audio data. For example, both the denoising operation performed on the second audio data and the denoising operation performed on the third audio data may use a spectral subtraction algorithm. As another example, the denoising operation performed on the second audio data may use a wiener filter, and the denoising operation performed on the third audio data may use a spectral subtraction algorithm. In some embodiments, the processing device 122 may perform an IFT operation on the third audio data in the frequency domain to obtain the target audio data in the time domain.

In some embodiments, the processing device 122 may transmit a signal to a client terminal (e.g., the terminal 130), the storage device 140, and/or any other storage device (not shown in the audio signal generation system 100) via the network 150. The signal may include the target audio data. The signal may be also configured to direct the client terminal to play the target audio data.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 550 may be omitted. As another example, operations 510 and 520 may be integrated into one single operation.

Figure 6:
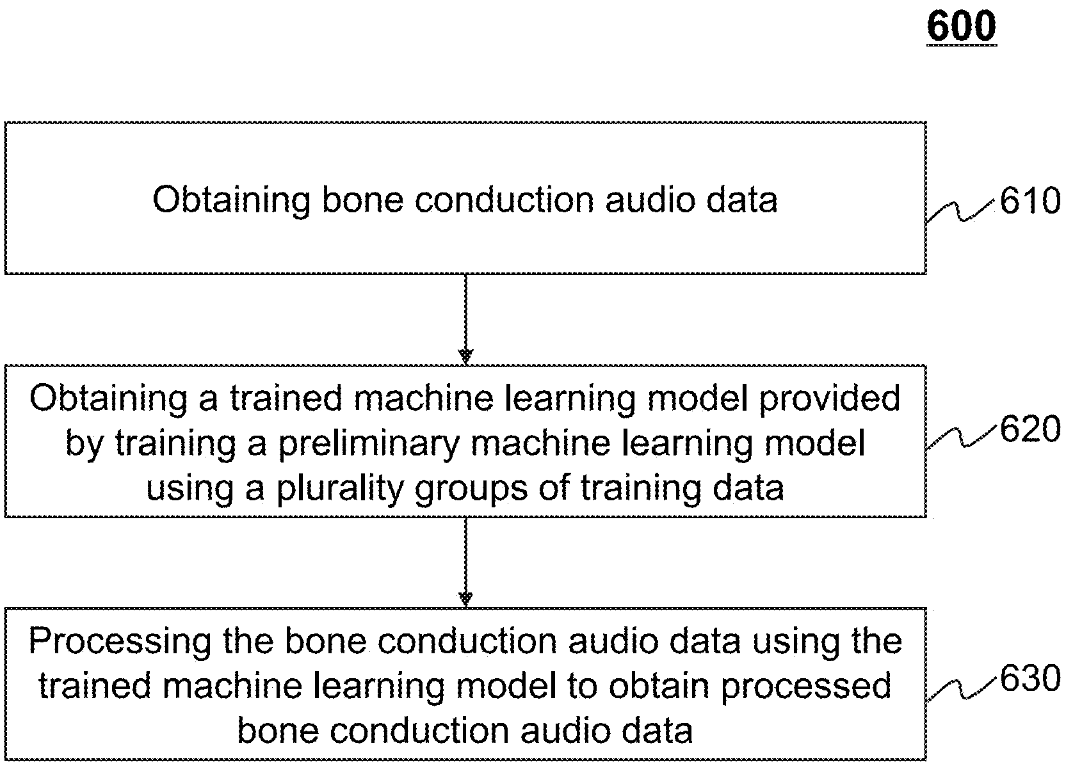
FIG. 6 is a schematic flowchart illustrating an exemplary process for reconstructing bone conduction audio data using a trained machine learning model according to some embodiments of the present disclosure.

FIG. 6 is a schematic flowchart illustrating an exemplary process for reconstructing bone conduction audio data using a trained machine learning model according to some embodiments of the present disclosure. In some embodiments, a process 600 may be implemented as a set of instructions (e.g., an application) stored in the storage device 140, ROM 230 or RAM 240, or storage 390. The processing device 122, the processor 220 and/or the CPU 340 may execute the set of instructions, and when executing the instructions, the processing device 122, the processor 220 and/or the CPU 340 may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process 600 illustrated in FIG. 6 and described below is not intended to be limiting. In some embodiments, one or more operations of the process 600 may be performed to achieve at least part of operation 530 as described in connection with FIG. 5.

In 610, the processing device 122 (e.g., the obtaining module 410) may obtain bone conduction audio data. In some embodiments, the bone conduction audio data may be original audio data (e.g., the first audio data) collected by a bone conduction sensor when a user speaks as described elsewhere in the present disclosure (e.g., FIG. 1 and the descriptions thereof). For example, the speech of the user may be collected by the bone conduction sensor (e.g., the bone conduction microphone 112) to generate an electrical signal (e.g., an analog signal or a digital signal) (i.e., the bone conduction audio data). The bone conduction sensor may transmit the electrical signal to the server 120, the terminal 130, and/or the storage device 140 via the network 150. In some embodiments, the bone conduction audio data may include acoustic characteristics and/or semantic information that may reflect the content of the speech of the user. Exemplary acoustic characteristics may include one or more features associated with duration, one or more features associated with energy, one or more features associated with fundamental frequency, one or more features associated with frequency spectrum, one or more features associated with phase spectrum, etc., as described elsewhere in the present disclosure (e.g., FIG. 5 and the descriptions thereof).

In 620, the processing device 122 (e.g., the obtaining module 410) may obtain a trained machine learning model. The trained machine learning model may be provided by training a preliminary machine learning model using a plurality of groups of training data. In some embodiments, the trained machine learning model may be configured to process specific bone conduction audio data to obtain processed bone conduction audio data. The processed bone conduction audio data may be also referred to as reconstructed bone conduction audio data. Frequency components of the processed bone conduction audio data higher than a frequency threshold or a frequency point (e.g., 1000 Hz, 2000 Hz, 3000 Hz, 4000 Hz, etc.) may increase with respect to frequency components of the specific bone conduction audio data higher than the frequency threshold or a frequency point (e.g., 1000 Hz, 2000 Hz, 3000 Hz, 4000 Hz, etc.). The processed bone conduction audio data may be identical, similar, or close to ideal air conduction audio data with no or less noise collected by an air conduction sensor at the same time with the specific bone conduction audio data and representing a same speech with the specific bone conduction audio data. As used herein, the processed bone conduction audio data identical, similar, or close to the ideal air conduction audio data may refer to a similarity between acoustics characteristics of the processed bone conduction audio data and the ideal air conduction audio data is greater than a threshold (e.g., 0.9, 0.8, 0.7, etc.). For example, in a noise-free environment, bone conduction audio data and air conduction audio data may be obtained simultaneously from a user when the user speaks by the bone conduction microphone 112 and the air conduction microphone 114, respectively. The processed bone conduction audio data generated by the trained machine learning model processing the bone conduction audio data may have identical or similar acoustics characteristics to the corresponding air conduction audio data collected by the air conduction microphone 114. In some embodiments, the processing device 122 may obtain the trained machine learning model from the terminal 130, the storage device 140, or any other storage device.

In some embodiments, the preliminary machine learning model may be constructed based on a deep learning model, a traditional machine learning model, or the like, or any combination thereof. The deep learning model may include a convolutional neural network (CNN) model, a recurrent neural network (RNN) model, a long short-term memory network (LSTM) model, or the like, or any combination thereof. The traditional machine learning model may include a hidden Markov model (HMM), a multilayer perceptron (MLP) model, or the like, or any combination thereof. In some embodiments, the preliminary machine learning model may include multiple layers, for example, an input layer, multiple hidden layers, and an output layer. The multiple hidden layers may include one or more convolutional layers, one or more pooling layers, one or more batch normalization layers, one or more activation layers, one or more fully connected layers, a cost function layer, etc. Each of the multiple layers may include a plurality of nodes. In some embodiments, the preliminary machine learning model may be defined by a plurality of architecture parameters and a plurality of learning parameters, also referred to as training parameters. The plurality of learning parameters may be altered during the training of the preliminary machine learning model using the plurality of groups of training data. The plurality of architecture parameters may be set and/or adjusted by a user before the training of the preliminary machine learning model. Exemplary architecture parameters of the machine learning model may include the size of a kernel of a layer, the total count (or number) of layers, the count (or number) of nodes in each layer, a learning rate, a batch size, an epoch, etc. For example, if the preliminary machine learning model includes a LSTM model, the LSTM model may include one single input layer with 2 nodes, four hidden layers each of which includes 30 nodes, and one single output layer with 2 nodes. The time steps of the LSTM model may be 65 and the learning rate may be 0.003. Exemplary learning parameters of the machine learning model may include a connected weight between two connected nodes, a bias vector relating to a node, etc. The connected weight between two connected nodes may be configured to represent a proportion of an output value of a node to be as an input value of another connected node. The bias vector relating to a node may be configured to control an output value of the node deviating from an origin.

In some embodiments, the trained machine learning model may be determined by training the preliminary machine learning model using the plurality of groups of training data based on a machine learning model training algorithm. In some embodiments, one or more groups of the plurality of groups of training data may be obtained in a noise-free environment, for example, in a silencing room. A group of training data may include specific bone conduction audio data and corresponding specific air conduction audio data. The specific bone conduction audio data and the corresponding specific air conduction audio data in the group of training data may be simultaneously obtained from a specific user by a bone conduction sensor (e.g., the bone conduction microphone 112) and an air conduction sensor (e.g., the air conduction microphone 114), respectively. In some embodiments, each group of at least a portion of the plurality of groups may include specific bone conduction audio data and reconstructed bone conduction audio data generated by reconstructing the specific bone conduction audio data using one or more reconstructed technique as described elsewhere in the present disclosure. Exemplary machine learning model training algorithms may include a gradient descent algorithm, a Newton's algorithm, a quasi-Newton algorithm, a Levenberg-Marquardt algorithm, a conjugate gradient algorithm, or the like, or a combination thereof. The trained machine learning model may be configured to provide a corresponding relationship between bone conduction audio data (e.g., the first audio data) and reconstructed bone conduction audio data (e.g., equivalent air conduction audio data). The trained machine learning model may be configured to reconstruct the bone conduction audio data based on the corresponding relationship. In some embodiments, the bone conduction audio data in each of the plurality of groups of training data may be collected by a bone conduction sensor positioned at a same region (e.g., the area around an ear) of the body of a user (e.g., a tester). In some embodiments, the region of the body where a bone conduction sensor is positioned for collecting the bone conduction audio data used for the training of the trained machine learning model may be consistent with and/or the same as the region of the body where the bone conduction sensor is positioned for collecting bone conduction audio data (e.g., the first audio data) used for application of the trained machine learning model. For example, the region of the body of a user (e.g., a tester) where the bone conduction sensor is positioned for collecting the bone conduction audio data in each group of the plurality of groups of training data may be the same as a region of the body of the user where the bone conduction sensor is positioned for collecting the first audio data. As a further example, if a region of the body of the user where the bone conduction sensor is positioned for collecting the first audio data is the neck, a region of a body where a bone conduction sensor is positioned for collecting the bone conduction audio data used in the training process of the trained machine learning model may also be the neck of the body.

In some embodiments, the region of the body of a user (e.g., a tester) where the bone conduction sensor is positioned for collecting the plurality of groups of training data may affect the corresponding relationship between the bone conduction audio data (e.g., the first audio data) and the reconstructed bone conduction audio data (e.g., the equivalent air conduction audio data), thus affecting the reconstructed bone conduction audio data generated based on the corresponding relationship using the trained machine learning model. The plurality of groups of training data collected by the bone conduction sensor located at different regions of the body of a user (e.g., a tester) may correspond to different corresponding relationships between the bone conduction audio data (e.g., the first audio data) and the reconstructed bone conduction audio data (e.g., the equivalent air conduction audio data) when the plurality of groups of training data collected by the bone conduction sensor located at different regions are used for the training of the trained machine learning model. For example, multiple bone conduction sensors in the same configuration may be located at different regions of a body, such as the mastoid, a temple, the top of the head, the external auditory meatus, etc. The multiple bone conduction sensors may collect bone conduction audio data when the user speaks. Multiple training sets may be formed based on the bone conduction audio data collected by the multiple bone conduction sensors. Each set of the multiple training sets may include a plurality of groups of training data collected by one of the multiple bone conduction sensors and an air conduction sensor. Each set of the plurality of groups of training data may include bone conduction audio data and air conduction audio data representing a same speech. Each set of the multiple training sets may be used to train a machine learning model to obtain a trained machine learning model. Multiple trained machine learning models may be obtained based on the multiple training sets. The multiple trained machine learning models may provide different corresponding relationships between specific bone conduction audio data and reconstructed bone conduction audio data. For example, different reconstructed bone conduction audio data may be generated by inputting the same bone conduction audio data into multiple trained machine learning models. In some embodiments, bone conduction audio data (e.g., frequency response curves) collected by different bone conduction sensors in different configurations may be different. Therefore, the bone conduction sensor for collecting the bone conduction audio data used for the training of the trained machine learning model may be consistent with and/or the same as the bone conduction sensor for collecting bone conduction audio data (e.g., the first audio data) used for application of the trained machine learning model in the configuration. In some embodiments, bone conduction audio data (e.g., frequency response curves of) collected by a bone conduction sensor located at a region of the user's body with different pressures in a range, such as 0 Newton to 1 Newton, or 0 Newton to 0.8 Newton, etc., may be different. Therefore, the pressure that the bone conduction sensor applies to a region of a user's body for collecting the bone conduction audio data for the training of the trained machine learning model may be consistent with and/or the same as the pressure that the bone conduction sensor applies to a region of a user's body for collecting the bone conduction audio data for application of the trained machine learning model.

In some embodiments, the trained machine learning model may be obtained by performing a plurality of iterations to update one or more learning parameters of the preliminary machine learning model. For each of the plurality of iterations, a specific group of training data may first be input into the preliminary machine learning model. For example, the specific bone conduction audio data of the specific group of training data may be input into an input layer of the preliminary machine learning model, and the specific air conduction audio data of the specific group of training data may be input into an output layer of the preliminary machine learning model as a desired output of the preliminary machine learning model corresponding to the specific bone conduction audio data. The preliminary machine learning model may extract one or more acoustic characteristics (e.g., a duration feature, an amplitude feature, a fundamental frequency feature, etc.) of the specific bone conduction audio data and the specific air conduction audio data included in the specific group of training data. Based on the extracted characteristics, the preliminary machine learning model may determine a predict output corresponding to the specific bone conduction data. The predicted output corresponding to the specific bone conduction data may then be compared with the input specific air conduction audio data (i.e., the desired output) in the output layer corresponding to the specific group of training data based on a cost function. The cost function of the preliminary machine learning model may be configured to assess a difference between an estimated value (e.g., the predicted output) of the preliminary machine learning model and an actual value (e.g., the desired output or the specific input air conduction audio data). If the value of the cost function exceeds a threshold in a current iteration, learning parameters of the preliminary machine learning model may be adjusted and updated to cause the value of the cost function (i.e., the difference between the predicted output and the input specific air conduction audio data) less than the threshold. Accordingly, in a next iteration, another group of training data may be input into the preliminary machine learning model to train the preliminary machine learning model as described above. Then the plurality of iterations may be performed to update the learning parameters of the preliminary machine learning model until a terminated condition is satisfied. The terminated condition may provide an indication of whether the preliminary machine learning model is sufficiently trained. For example, the terminated condition may be satisfied if the value of the cost function associated with the preliminary machine learning model is minimal or less than a threshold (e.g., a constant). As another example, the terminated condition may be satisfied if the value of the cost function converges. The convergence of the cost function may be deemed to have occurred if the variation of the values of the cost function in two or more consecutive iterations is less than a threshold (e.g., a constant). As still an example, the terminated condition may be satisfied when a specified number of iterations are performed in the training process. The trained machine learning model may be determined based on the updated learning parameters. In some embodiments, the trained machine learning model may be transmitted to the storage device 140, the storage module 440, or any other storage device for storage.

In 630, the processing device 122 (e.g., the preprocessing module 420) may process the bone conduction audio data using the trained machine learning model to obtain processed bone conduction audio data. In some embodiments, the processing device 122 may input the bone conduction audio data (e.g., the first audio data or the normalized first audio data as described in FIG. 5) into the trained machine learning model, then the trained machine learning model may output the processed bone conduction audio data (e.g., the reconstructed first audio data as described in FIG. 5). In some embodiments, the processing device 122 may extract acoustic characteristics of the bone conduction audio data (e.g., the first audio data or the normalized first audio data as described in FIG. 5) and input the extracted acoustic characteristics of the bone conduction audio data (e.g., the first audio data or the normalized first audio data as described in FIG. 5) into the trained machine learning model. The training machine learning model may output the processed bone conduction audio data. The frequency components of the processed bone conduction audio data higher than a frequency threshold (e.g., 1000 Hz, 2000 Hz, 3000 Hz, etc.) may increase with respect to frequency components of the bone conduction audio data higher than the frequency threshold. In some embodiments, the processing device 122 may transmit the processed bone conduction audio data to a client terminal (e.g., the terminal 130). The client terminal (e.g., the terminal 130) may convert the processed bone conduction audio data to a voice and broadcast to the voice to a user.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 7:
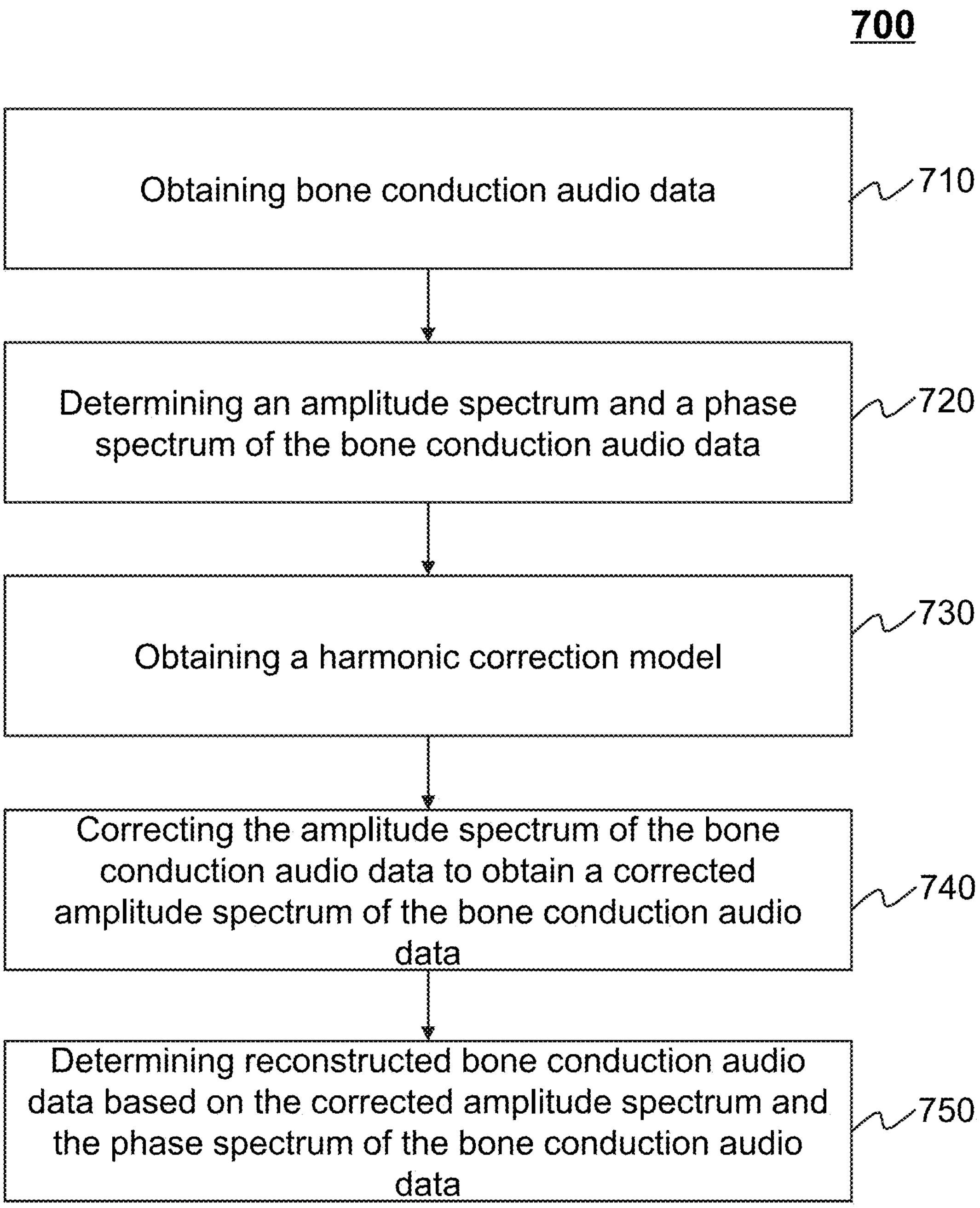
FIG. 7 is a schematic flowchart illustrating an exemplary process for reconstructing bone conduction audio data using a harmonic correction model according to some embodiments of the present disclosure.

FIG. 7 is a schematic flowchart illustrating an exemplary process for reconstructing bone conduction audio data using a harmonic correction model according to some embodiments of the present disclosure. In some embodiments, a process 700 may be implemented as a set of instructions (e.g., an application) stored in the storage device 140, ROM 230 or RAM 240, or storage 390. The processing device 122, the processor 220 and/or the CPU 340 may execute the set of instructions, and when executing the instructions, the processing device 122, the processor 220 and/or the CPU 340 may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process 700 illustrated in FIG. 7 and described below is not intended to be limiting. In some embodiments, one or more operations of the process 700 may be performed to achieve at least part of operation 530 as described in connection with FIG. 5.

In 710, the processing device 122 (e.g., the obtaining module 410) may obtain bone conduction audio data. In some embodiments, the bone conduction audio data may be original audio data (e.g., the first audio data) collected by a bone conduction sensor when a user speaks as described in connection with operation 510. For example, the speech of the user may be collected by the bone conduction sensor (e.g., the bone conduction microphone 112) to generate an electrical signal (e.g., an analog signal or a digital signal) (i.e., the bone conduction audio data). In some embodiments, the bone conduction audio data may include multiple waves with different frequencies and amplitudes. The bone conduction audio data in a frequency domain may be denoted as a matrix including a plurality of elements. Each of the plurality of elements may denote a frequency and an amplitude of a wave.

In 720, the processing device 122 (e.g., the preprocessing module 420) may determine an amplitude spectrum and a phase spectrum of the bone conduction audio data. In some embodiments, the processing device 122 may determine the amplitude spectrum and the phase spectrum of the bone conduction audio data by performing a Fourier transform (FT) operation on the bone conduction audio data. The processing device 122 may determine the amplitude spectrum and the phase spectrum of the bone conduction audio data in the frequency domain. For example, the processing device 122 may detect peak values of waves included in the bone conduction audio data using a peak detection technique, such as a spectral envelope estimation vocoder algorithm (SEEVOC). The processing device 122 may determine the amplitude spectrum and the phase spectrum of the bone conduction audio data based on peak values of waves. For example, an amplitude of a wave of the bone conduction audio data may be half the distance between a peak and a valley of the wave.

In 730, the processing device 122 (e.g., the preprocessing module 420) may obtain a harmonic correction model. The harmonic correction model may be configured to provide a relationship between an amplitude spectrum of specific air conduction audio data and an amplitude spectrum of specific bone conduction audio data corresponding to the specific air conduction audio data. The amplitude spectrum of the specific air conduction audio data may be determined based on the amplitude spectrum of specific bone conduction audio data corresponding to the specific air conduction audio data based on the relationship. As used herein, the specific air conduction audio data may be also referred to as equivalent air conduction audio data or reconstructed bone conduction audio data corresponding to the specific bone conduction audio data.

In some embodiments, the harmonic correction model may be a default setting of the audio signal generation system 100. In some embodiments, the processing device 122 may obtain the harmonic correction model from the storage device 140, the storage module 440, or any other storage device for storage. In some embodiments, the harmonic correction model may be determined based on one or more groups of bone conduction audio data and corresponding air conduction audio data. The bone conduction audio data and corresponding air conduction audio data in each group may be respectively collected by a bone conduction sensor and an air conduction sensor simultaneously in a noise-free environment when an operator (e.g., a tester) speaks. The bone conduction sensor and the air conduction sensor may be same as or different from the bone conduction sensor for collecting the first audio data and the air conduction sensor for collecting the second audio data respectively. In some embodiments, the harmonic correction model may be determined based on one or more groups of bone conduction audio data and corresponding air conduction audio data according to the following operations a1 to a3. In operation a1, the processing device 122 may determine an amplitude spectrum of bone conduction audio data in each group and an amplitude spectrum of corresponding air conduction audio data in each group using a peak value detection technique, such as a spectral envelope estimation vocoder algorithm (SEEVOC). In operation a2, the processing device 122 may determine a candidate correction matrix based on amplitude spectrums of the bone conduction audio data and the corresponding air conduction audio data in each group. For example, the processing device 122 may determine the candidate correction matrix based on a ratio of the amplitude spectrum of the bone conduction audio data and the amplitude spectrum of the corresponding air conduction audio data in each group. In operation a3, the processing device 122 may determine a harmonic correction model based on the candidate correction matrix corresponding to each group of the one or more groups of bone conduction audio data and corresponding air conduction audio data. For example, the processing device 122 may determine an average of candidate correction matrixes corresponding to the one or more groups of bone conduction audio data and corresponding air conduction audio data as the harmonic correction model.

In some embodiments, the region of the body where a bone conduction sensor is positioned for collecting the bone conduction audio data used for determining the harmonic correction model may be consistent with and/or the same as the region of the body where the bone conduction sensor is positioned for collecting bone conduction audio data (e.g., the first audio data) used for application of the harmonic correction model. For example, the region of the body of a user (e.g., a tester) where the bone conduction sensor is positioned for collecting the bone conduction audio data in each group of the one or more groups of corresponding bone conduction audio data and air conduction audio data may be same as a region of the body of the user where the bone conduction sensor is positioned for collecting the first audio data. As another example, if the region of the body where the bone conduction sensor is positioned for collecting bone conduction audio data (e.g., the first audio data) is the neck, the region of the body where a bone conduction sensor is positioned for collecting the bone conduction audio data used for determining the harmonic correction model may also be the neck. In some embodiments, the harmonic correction model may be different as the regions of the body where a bone conduction sensor is positioned for collecting the bone conduction audio data used for determining the harmonic correction model. For example, one or more first groups of corresponding bone conduction audio data and air conduction audio data collected by a first bone conduction sensor located at a first region of a body and an air conduction sensor, respectively, when a user speaks may be obtained. One or more second groups of corresponding bone conduction audio data and air conduction audio data collected by a second bone conduction sensor located at a second region of a body and the air conduction sensor, respectively, when a user speaks may be obtained. A first harmonic correction model may be determined based on the one or more first groups of corresponding bone conduction audio data and air conduction audio data. A second harmonic correction model may be determined based on the one or more second groups of corresponding bone conduction audio data and air conduction audio data. The second harmonic correction model may be different from the first harmonic correction model. The relationships between an amplitude spectrum of specific air conduction audio data and an amplitude spectrum of specific bone conduction audio data corresponding to the specific air conduction audio data provided by the first harmonic correction model and the second harmonic correction model may be different. Reconstructed bone conduction audio data determined, respectively based on the first harmonic correction model and the second harmonic correction model may be different based on same bone conduction audio data (e.g., the first audio data).

In 740, the processing device 122 (e.g., the preprocessing module 420) may correct the amplitude spectrum of the bone conduction audio data to obtain a corrected amplitude spectrum of the bone conduction audio data. In some embodiments, the harmonic correction model may include a correction matrix including a plurality of weight coefficients corresponding to each element in the amplitude spectrum of the bone conduction audio data (e.g., the first audio data or the normalized first audio data as described in FIG. 5). An element in the amplitude spectrum used herein may refer to a specific amplitude of a wave (i.e., a frequency component). The processing device 122 may correct the amplitude spectrum of the bone conduction audio data (e.g., the first audio data or the normalized first audio data as described in FIG. 5) by multiplying the correction matrix with the amplitude spectrum of the bone conduction audio data (e.g., the first audio data as described in FIG. 5) to obtain the corrected amplitude spectrum of the bone conduction audio data (e.g., the first audio data as described in FIG. 5).

In 750, the processing device 122 (e.g., the preprocessing module 420) may determine reconstructed bone conduction audio data based on the corrected amplitude spectrum and the phase spectrum of the bone conduction audio data. In some embodiments, the processing device 122 may perform an inverse Fourier transform on the corrected amplitude spectrum and the phase spectrum of the bone conduction audio data to obtain the reconstructed bone conduction audio data.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 8:
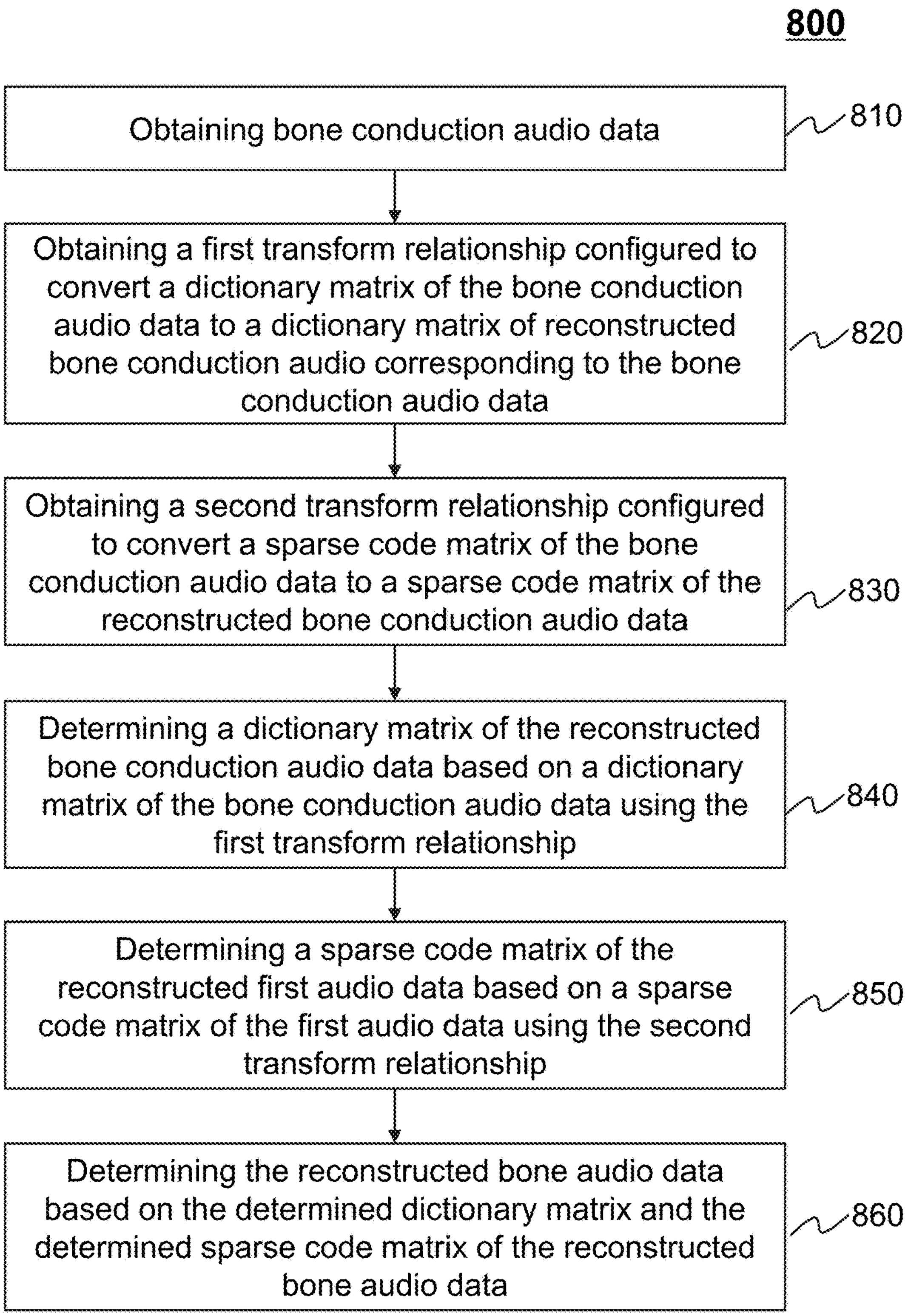
FIG. 8 is a schematic flowchart illustrating an exemplary process for reconstructing bone conduction audio data using a sparse matrix technique according to some embodiments of the present disclosure.

FIG. 8 is a schematic flowchart illustrating an exemplary process for reconstructing bone conduction audio data using a sparse matrix technique according to some embodiments of the present disclosure. In some embodiments, a process 800 may be implemented as a set of instructions (e.g., an application) stored in the storage device 140, ROM 230 or RAM 240, or storage 390. The processing device 122, the processor 220 and/or the CPU 340 may execute the set of instructions, and when executing the instructions, the processing device 122, the processor 220 and/or the CPU 340 may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process 800 illustrated in FIG. 8 and described below is not intended to be limiting. In some embodiments, one or more operations of the process 800 may be performed to achieve at least part of operation 530 as described in connection with FIG. 5.

In 810, the processing device 122 (e.g., the obtaining module 410) may obtain bone conduction audio data. In some embodiments, the bone conduction audio data may be original audio data (e.g., the first audio data) collected by a bone conduction sensor when a user speaks as described in connection with operation 510. For example, the speech of the user may be collected by the bone conduction sensor (e.g., the bone conduction microphone 112) to generate an electrical signal (e.g., an analog signal or a digital signal) (i.e., the bone conduction audio data). In some embodiments, the bone conduction audio data may include multiple waves with different frequencies and amplitudes. The bone conduction audio data in a frequency domain may be denoted as a matrix X. The matrix X may be determined based on a dictionary matrix D and a sparse code matrix C. For example, the audio data may be determined according to Equation (4) as follows:

$$X \approx DC. \tag{4}$$

In 820, the processing device 122 (e.g., the preprocessing module 420) may obtain a first transform relationship configured to convert a dictionary matrix of the bone conduction audio data to a dictionary matrix of reconstructed bone conduction audio corresponding to the bone conduction audio data. In some embodiments, the first transform relationship may be a default setting of the audio signal generation system 100. In some embodiments, the processing device 122 may obtain the first transform relationship from the storage device 140, the storage module 440, or any other storage device for storage. In some embodiments, the first transform relationship may be determined based on one or more groups of bone conduction audio data and corresponding air conduction audio data. The bone conduction audio data and corresponding air conduction audio data in each group may be respectively collected by a bone conduction sensor and an air conduction sensor simultaneously in a noise-free environment when an operator (e.g., a tester) speaks. For example, the processing device 122 may determine a dictionary matrix of the bone conduction audio data and a dictionary matrix of the corresponding air conduction audio data in each group of the one or more groups of bone conduction audio data and corresponding air conduction audio data as described in operation 840. The processing device 122 may divide the dictionary matrix of the corresponding air conduction audio data by the dictionary matrix of the bone conduction audio data for each group of the one or more groups of bone conduction audio data and corresponding air conduction audio data to obtain a candidate first transform relationship. In some embodiments, the processing device 122 may determine one or more candidate first transform relationships based on the one or more groups of bone conduction audio data and corresponding air conduction audio data. The processing device 122 may average the one or more candidate first transform relationships to obtain the first transform relationship. In some embodiments, the processing device 122 may determine one of the one or more candidate first transform relationships as the first transform relationship.

In 830, the processing device 122 (e.g., the preprocessing module 420) may obtain a second transform relationship configured to convert a sparse code matrix of the bone conduction audio data to a sparse code matrix of the reconstructed bone conduction audio data corresponding to the bone conduction audio data. In some embodiments, the second transform relationship may be a default setting of the audio signal generation system 100. In some embodiments, the processing device 122 may obtain the second transform relationship from the storage device 140, the storage module 440, or any other storage device for storage. In some embodiments, the second transform relationship may be determined based on the one or more groups of bone conduction audio data and corresponding air conduction audio data. For example, the processing device 122 may determine a sparse code matrix of the bone conduction audio data and a sparse code matrix of the corresponding air conduction audio data in each group of the one or more groups of bone conduction audio data and corresponding air conduction audio data as described in operation 840. The processing device 122 may divide the sparse code matrix of the corresponding air conduction audio data by the sparse code matrix of the bone conduction audio data to obtain a candidate second transform relationship for each group of the one or more groups of bone conduction audio data and corresponding air conduction audio data. In some embodiments, the processing device 122 may determine one or more candidate second transform relationships based on the one or more groups of bone conduction audio data and corresponding air conduction audio data. The processing device 122 may average the one or more candidate second transform relationships to obtain the second transform relationship. In some embodiments, the processing device 122 may determine one of the one or more candidate second transform relationships as the second transform relationship.

In some embodiments, the region of the body where a bone conduction sensor is positioned for collecting the bone conduction audio data used for determining the first transform relationship (and/or the second transform relationship) may be consistent with and/or the same as the region of the body where the bone conduction sensor is positioned for collecting bone conduction audio data (e.g., the first audio data) used for application of the first transform relationship (and/or the second transform relationship). For example, the region of the body of a user (e.g., a tester) where the bone conduction sensor is positioned for collecting the bone conduction audio data in each group of the one or more groups of corresponding bone conduction audio data and air conduction audio data may be the same as a region of the body of the user where the bone conduction sensor is positioned for collecting the first audio data. As another example, if the region of the body where the bone conduction sensor is positioned for collecting bone conduction audio data (e.g., the first audio data) is the neck, the region of the body where a bone conduction sensor is positioned for collecting the bone conduction audio data used for determining the first transform relationship (and/or the second transform relationship) may also be the neck. In some embodiments, the first transform relationship (and/or the second transform relationship) may be different as the regions of the body where a bone conduction sensor is positioned for collecting the bone conduction audio data used for determining the first transform relationship (and/or the second transform relationship) Reconstructed bone conduction audio data determined, respectively based on different first transform relationships (and/or the second transform relationships) may be different based on same bone conduction audio data (e.g., the first audio data).

In 840, the processing device 122 (e.g., the preprocessing module 420) may determine a dictionary matrix of the reconstructed bone conduction audio data (e.g., the reconstructed first audio data as described in FIG. 5) based on a dictionary matrix of the bone conduction audio data (e.g., the first audio data or the normalized first audio data as described in FIG. 5) using the first transform relationship. For example, the processing device 122 may multiply the first transform relationship (e.g., in a matrix form) with the dictionary matrix of the bone conduction audio data (e.g., the first audio data or the normalized first audio data as described in FIG. 5) to obtain the dictionary matrix of the reconstructed bone conduction audio data (e.g., the reconstructed first audio data as described in FIG. 5). The processing device 122 may determine a dictionary matrix and/or a sparse code matrix of audio data (e.g., the bone audio data (e.g., the first audio data or the normalized first audio data as described in FIG. 5), the bone conduction audio data and/or the air conduction audio data in a group) by performing a plurality of iterations. Before performing the plurality of iterations, the processing device 122 may initialize the dictionary matrix of the audio data (e.g., the first audio data or the normalized first audio data as described in FIG. 5) to obtain an initial dictionary matrix. For example, the processing device 122 may set each element in the initial dictionary matrix as 0 or 1. In each iteration, the processing device 122 may determine an estimated sparse code matrix using, for example, an orthogonal matching pursuit (OMP) algorithm based on the audio data (e.g., the first audio data or the normalized first audio data as described in FIG. 5) and the initial dictionary matrix. The processing device 122 may determine an estimated dictionary matrix using, for example, a K-singular value decomposition (K-SVD) algorithm based on the audio data (e.g., the first audio data or the normalized first audio data as described in FIG. 5) and the estimated sparse code matrix. The processing device 122 may determine an estimated audio data based on the estimated dictionary matrix and the estimated sparse code matrix according to Equation (4). The processing device 122 may compare the estimated audio data with the audio data (e.g., the first audio data or the normalized first audio data as described in FIG. 5). If a difference between the estimated audio data generated in a current iteration and the audio data exceeds a threshold, the processing device 122 may update the initial dictionary matrix using the estimated dictionary matrix generated in the current iteration. The processing device 122 may perform a next iteration based on the updated initial dictionary matrix until a difference between the estimated audio data generated in the current iteration and the audio data is less than the threshold. The processing device 122 may designate the estimated dictionary matrix and the estimated sparse code matrix generated in the current iteration as the dictionary matrix and/or the sparse code matrix of the audio data (e.g., the first audio data or the normalized first audio data as described in FIG. 5) if the difference between the estimated audio data generated in the current iteration and the audio data is less than the threshold.

In 850, the processing device 122 (e.g., the preprocessing module 420) may determine a sparse code matrix of the reconstructed bone conduction audio data (e.g., the reconstructed first audio data as described in FIG. 5) based on a sparse code matrix of the bone conduction audio data (e.g., the first audio data or the normalized first audio data as described in FIG. 5) using the second transform relationship. For example, the processing device 122 may multiply the second transform relationship (e.g., a matrix) with the sparse code matrix of the bone conduction audio data (e.g., the first audio data or the normalized first audio data as described in FIG. 5) to obtain the sparse code matrix of the reconstructed bone conduction audio data (e.g., the reconstructed first audio data as described in FIG. 5). The sparse code matrix of the bone conduction audio data (e.g., the first audio data or the normalized first audio data as described in FIG. 5) may be determined as described in operation 840.

In 860, the processing device 122 (e.g., the preprocessing module 420) may determine the reconstructed bone audio data (e.g., the reconstructed first audio data as described in FIG. 5) based on the determined dictionary matrix and the determined sparse code matrix of the reconstructed bone audio data. The processing device 122 may determine the reconstructed bone conduction audio data based on the determined dictionary matrix in operation 840 and the determined sparse code matrix in operation 850 of the reconstructed bone conduction audio data according to Equation (4).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operations 820 and 830 may be integrated into one single operation.

Figure 9:
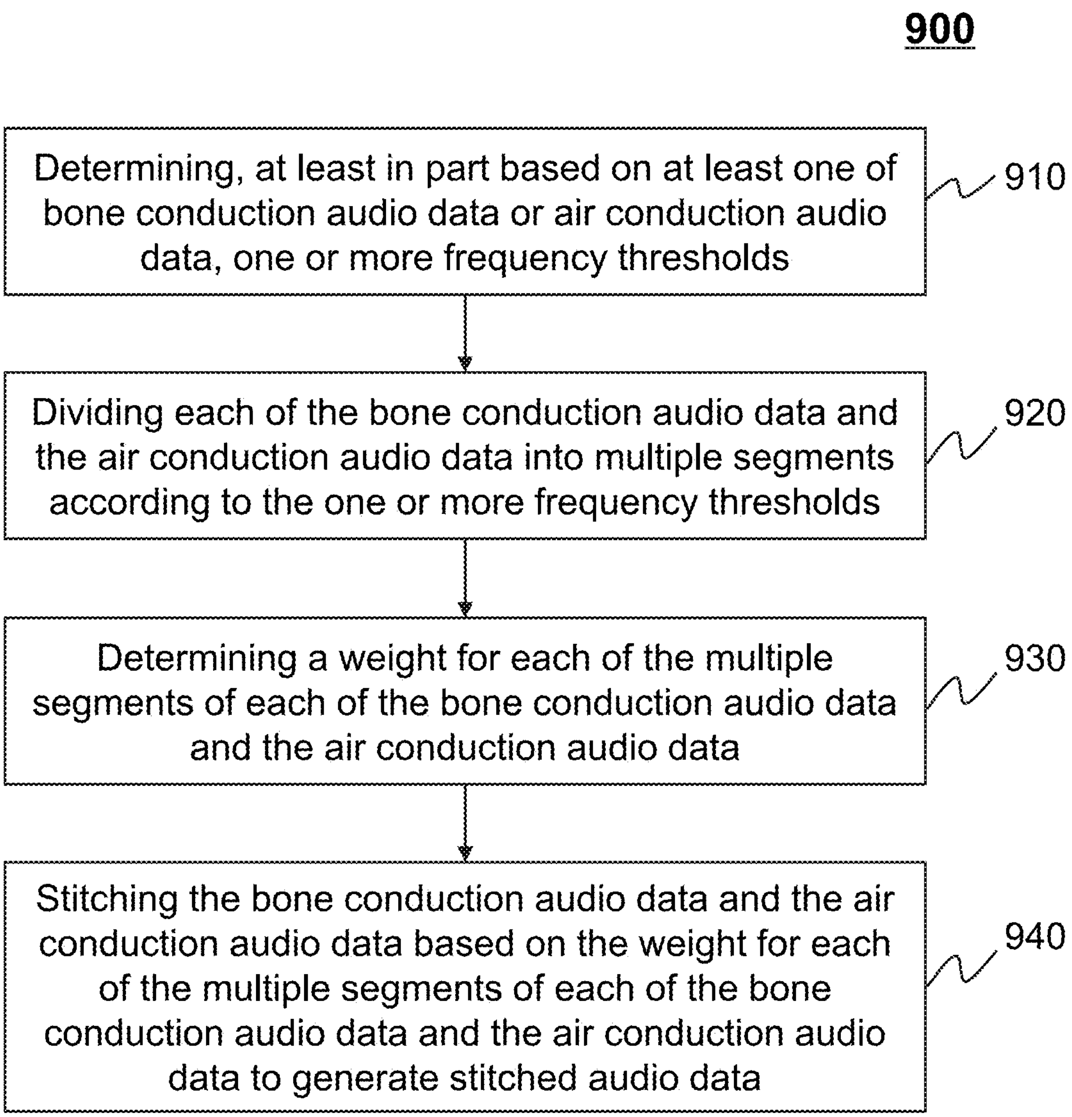
FIG. 9 is a schematic flowchart illustrating an exemplary process for generating audio data according to some embodiments of the present disclosure.

FIG. 9 is a schematic flowchart illustrating an exemplary process for generating audio data according to some embodiments of the present disclosure. In some embodiments, a process 900 may be implemented as a set of instructions (e.g., an application) stored in the storage device 140, ROM 230 or RAM 240, or storage 390. The processing device 122, the processor 220 and/or the CPU 340 may execute the set of instructions, and when executing the instructions, the processing device 122, the processor 220 and/or the CPU 340 may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process 900 illustrated in FIG. 9 and described below is not intended to be limiting. In some embodiments, one or more operations of the process 900 may be performed to achieve at least part of operation 540 as described in connection with FIG. 5.

In 910, the processing device 122 (e.g., the audio data generation module 430 or the frequency determination unit 432) may determine one or more frequency thresholds at least in part based on at least one of bone conduction audio data or air conduction audio data. The bone conduction audio data (e.g., the first audio data or preprocessed first audio data) and the air conduction audio data (e.g., the second audio data or preprocessed second audio data) may be collected respectively by a bone conduction sensor and an air conduction sensor simultaneously when a user speaks. More descriptions for the bone conduction audio data and the air conduction audio data may be found elsewhere in the present disclosure (e.g., FIG. 5 and the descriptions thereof).

Figure 11:
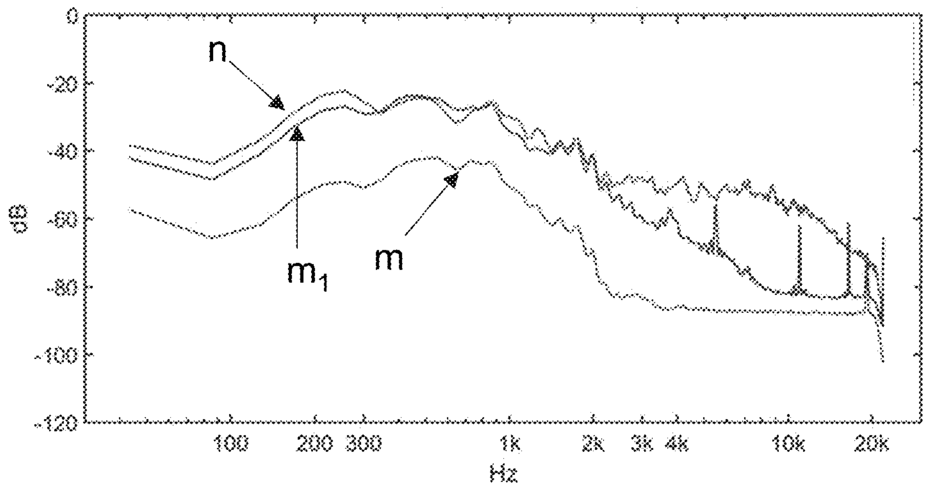
FIG. 11 is a diagram illustrating frequency response curves of bone conduction audio data, corresponding reconstructed bone audio data, and corresponding air conduction audio data according to some embodiments of the present disclosure.

As used herein, a frequency threshold may refer to a frequency point. In some embodiments, a frequency threshold may be a frequency point of the bone conduction audio data and/or the air conduction audio data. In some embodiments, a frequency threshold may be different from a frequency point of the bone conduction audio data and/or the air conduction audio data. In some embodiments, the processing device 122 may determine a frequency threshold based on a frequency response curve associated with the bone conduction audio data. The frequency response curve associated with the bone conduction audio data may include frequency response values varied according to frequency. In some embodiments, the processing device 122 may determine the one or more frequency thresholds based on the frequency response values of the frequency response curve associated with the bone conduction audio data. For example, the processing device 122 may determine a maximum frequency (e.g., 2000 Hz of the frequency response curve m as shown in FIG. 11) as a frequency threshold among a frequency range (e.g., 0-2000 Hz of the frequency response curve m as shown in FIG. 11) corresponding to frequency response values less than a threshold (e.g., about 80 dB of the frequency response curve m as shown in FIG. 11). As another example, the processing device 122 may determine a minimum frequency (e.g., 4000 Hz of the frequency response curve m as shown in FIG. 11) as a frequency threshold among a frequency range (e.g., 4000 Hz-20 kHz) of the frequency response curve m as shown in FIG. 11) corresponding to frequency response values greater than a threshold (e.g., about 90 dB of the frequency response curve m as shown in FIG. 11). As still another example, the processing device 122 may determine a minimum frequency and a maximum frequency as two frequency thresholds among a frequency range corresponding to frequency response values in a range. As a further example, as shown in FIG. 11, the processing device 122 may determine the one or more frequency thresholds based on a frequency response curve "m" of the bone conduction audio data. The processing device 122 may determine a frequency range (0-2000 Hz) corresponding to frequency response values less than a threshold (e.g., 70 dB). The processing device 122 may determine a maximum frequency in the frequency range as a frequency threshold. In some embodiments, the processing device 122 may determine the one or more frequency thresholds based on a change of the frequency response curve. For example, the processing device 122 may determine a maximum frequency and/or a minimum frequency as frequency thresholds among a frequency range of the frequency response curve with a stable change. As another example, the processing device 122 may determine a maximum frequency and/or a minimum frequency as frequency thresholds among a frequency range of the frequency response curve changing sharply. As a further example, the frequency response curve m in a frequency range less than 1000 Hz changes stably with respect to a frequency range greater than 1000 Hz and less than 4000 Hz. The processing device 122 may determine 1000 Hz and 4000 Hz as the frequency thresholds. In some embodiments, the processing device 122 may reconstruct the bone conduction audio data using one or more reconstruction techniques as described elsewhere in the present disclosure (e.g., FIG. 5 and the descriptions thereof) to obtain reconstructed bone conduction audio data. The processing device 122 may determine a frequency response curve associated with the reconstructed bone conduction audio data. The processing device 122 may determine the one or more frequency thresholds based on the frequency response curve associated with the reconstructed bone conduction audio data similar to or same as based on the bone conduction audio data as described above.

In some embodiments, the processing device 122 may determine one or more frequency thresholds based on a noise level associated with at least a portion of the air conduction audio data. The higher the noise level is, the higher one (e.g., the minimum frequency threshold) of the one or more frequency thresholds may be. The lower the noise level is, the lower one (e.g., the minimum frequency threshold) of the one or more frequency thresholds may be. In some embodiments, a noise level associated with the air conduction audio data may be denoted by the amount or energy of noises included in the air conduction audio data. The greater the amount or energy of noises included in the air conduction audio data is, the greater the noise level may be. In some embodiments, the noise level may be denoted by a signal to noise ratio (SNR) of the air conduction audio data. The greater the SNR is, the lower the noise level may be. The greater the SNR associated with the air conduction audio data is, the lower the frequency threshold may be. For example, if the SNR is 0 dB, the frequency threshold may be 2000 Hz. If the SNR is 20 dB, the frequency threshold may be 4000 Hz. For example, the frequency threshold may be determined based on Equation (5) as follows:

$$F_{point} = \begin{cases} F1\ \text{Hz}(SNR < A1\ \text{dB}) \\ F2\ \text{Hz}(A1\ \text{dB} < SNR < A2\ \text{dB}) \\ F3\ \text{Hz}(SNR > A2\ \text{dB}) \end{cases}, \tag{5}$$

where $F_{point}$ represents the frequency threshold, F1, F2, and/or F3 may be values in a range from 0-20 KHz, and F1>F2>F3. A1 and/or A2 may be a default setting of the audio signal generation system 100. For example, A1 and/or A2 may be constants, such as 0 and/or 20, respectively.

Further, the frequency threshold may be denoted by Equation (6) as follows:

$$F_{point} = \begin{cases} 4000\ \text{Hz}(SNR < 0\ \text{dB}) \\ 3000\ \text{Hz}(0\ \text{dB} < SNR < 20\ \text{dB}) \\ 2000\ \text{Hz}(SNR > 20\ \text{dB}) \end{cases}, \tag{6}$$

In some embodiments, the processing device 122 may determine the SNR of the air conduction audio data according to Equation (7) as follows:

$$SNR = 10\log_{10}\frac{\sum_{n=0}^{N-1} s_{(n)}^2}{\sum_{n=0}^{N-1} d_{(n)}^2}, \tag{7}$$

where n refers to the nth speech frame in the air conduction audio data, $\Sigma_{n=0}^{N-1}s_{(n)}^2$ refers to the energy of pure audio data included in the air conduction audio data, and $\Sigma_{n=0}^{N-1}d_{(n)}^2$ refers to the energy of noise data included in the air conduction audio data. In some embodiments, the processing device 122 may determine the noise data included in the air conduction audio data using a noise estimation algorithm, such as a minima statistical (MS) algorithm, a minima controlled recursive averaging (MCRA) algorithm, etc. The processing device 122 may determine the pure audio data included in the air conduction audio data based on the determined noise data included in the air conduction audio data. Then the processing device 122 may determine the energy of the pure audio data included in the air conduction audio data and the energy of the determined noise data included in the air conduction audio data. In some embodiments, the processing device 122 may determine the noise data included in the air conduction audio data using the bone conduction sensor and the air conduction sensor. For example, the processing device 122 may determine reference audio data collected by the air conduction sensor while no signals are collected by the bone conduction sensor at a certain time or period close to a time when the air conduction audio data is collected by the air conduction sensor. As used herein, a time or period close to another time may refer to a difference between the time or period and the another time is less than a threshold (e.g., 10 milliseconds, 100 milliseconds, 1 second, 2 seconds, 3 seconds, 4 seconds, etc.). The reference audio data may be equivalent to the noise data included in the air conduction audio data. Then the processing device 122 may determine the pure audio data included in the air conduction audio data based on the determined noise data (i.e., the reference audio data) included in the air conduction audio data. The processing device 122 may determine the SNR associated with the air conduction audio data according to Equation (7).

In some embodiments, the processing device 122 may extract energy of the determined noise data included in the air conduction audio data and determine the energy of pure audio data based on the energy of the determined noise data and the total energy of the air conduction audio data. For example, the processing device 122 may subtract the energy of the estimated noise data included in the air conduction audio data from the total energy of the air conduction audio data to obtain the energy of the pure audio data included in the air conduction audio data. The processing device 122 may determine the SNR based on the energy of pure audio data and the energy of the determined noise data according to Equation (7).

In 920, the processing device 122 (e.g., the audio data generation module 430 or the weight determination unit 434) may determine multiple segments of each of the bone conduction audio data and the air conduction audio data according to the one or more frequency thresholds. In some embodiments, the bone conduction audio data and the air conduction audio data may be in a time domain, and the processing device 122 may perform a domain transform operation (e.g., a FT operation) on the bone conduction audio data and the air conduction audio data to convert the bone conduction audio data and the air conduction audio data to a frequency domain. In some embodiments, the bone conduction audio data and the air conduction audio data may be in the frequency domain. Each of the bone conduction audio data and the air conduction audio data in the frequency domain may include a frequency spectrum. The bone conduction audio data in the frequency domain may be also referred to as bone conduction frequency spectrum. The air conduction audio data in the frequency domain may also be referred to as air conduction frequency spectrum. The processing device 122 may divide the bone conduction frequency spectrum and the air conduction frequency spectrum into the multiple segments. Each segment of the bone conduction audio data may correspond to one segment of the air conduction audio data. As used herein, a segment of the bone conduction audio data corresponding to a segment of the air conduction audio data may refer to that the two segments of the bone conduction audio data and the air conduction audio data is defined by one or two same frequency thresholds. For example, if a specific segment of the bone conduction audio data is defined by frequency points 2000 Hz and 4000 Hz, in other words, the specific segment of the bone conduction audio data includes frequency components in a range from 2000 Hz to 4000 Hz, a segment of the air conduction audio data corresponding to the specific segment of the bone conduction audio data may be also defined by frequency thresholds 2000 Hz and 4000 Hz. In other words, the segment of the air conduction audio data that corresponds to the specific segment of the bone conduction audio data including frequency components in a range from 2000 Hz to 4000 Hz may include frequency components in a range from 2000 Hz to 4000 Hz.

In some embodiments, a count or number of the one or more frequency thresholds may be one, the processing device 122 may divide each of the bone conduction frequency spectrum and the air conduction frequency spectrum into two segments. For example, one segment of the bone conduction frequency spectrum may include a portion of the bone conduction frequency spectrum with frequency components less than the frequency threshold and another segment of the bone conduction frequency spectrum may include a rest portion of the bone conduction frequency spectrum with frequency components higher than the frequency threshold.

In 930, the processing device 122 (e.g., the audio data generation module 430 or the weight determine sub-module 434) may determine a weight for each of the multiple segments of each of the bone conduction audio data and the air conduction audio data. In some embodiments, a weight for a specific segment of the bone conduction audio data and a weight for the corresponding specific segment of the air conduction audio data may satisfy a criterion such that the sum of the weight for the specific segment of the bone conduction audio data and the weight for the corresponding specific segment of the air conduction audio data is equal to 1. For example, if the processing device 122 divides the bone conduction audio data and the air conduction audio data into two segments according to one single frequency threshold. The weight of one segment of the bone conduction audio data with frequency components lower than the one single frequency threshold (also referred to as a lower portion of the bone conduction audio data) may be equal to 1, or 0.9, or 0.8, etc. The weight of one segment of the air conduction audio data with frequency components lower than the one single frequency threshold (also referred to as a lower portion of the air conduction audio data) may be equal to 0, or 0.1, or 0.2, etc., corresponding to the weight of one segment of the bone conduction audio data 1, or 0.9, or 0.8, etc., respectively. The weight of another one segment of the bone conduction audio data with frequency components greater than the one single frequency threshold (also referred to as a higher portion of the bone conduction audio data) may be equal to 0, or 0.1, or 0.2, etc. The weight of another one segment of the air conduction audio data with frequency components higher than the one single frequency threshold (also referred to as a higher portion of the air conduction audio data) may be equal to 1, or 0.9, or 0.8, etc., corresponding to the weight of one segment of the bone conduction audio data 0, or 0.1, or 0.2, etc., respectively.

In some embodiments, the processing device 122 may determine weights for different segments of the bone conduction audio data or the air conduction audio data based on the SNR of the air conduction audio data. For example, the lower the SNR of the air conduction audio data is, the greater the weight of a specific segment of the bone conduction may be, and the lower the weight of a corresponding specific segment of the air bone conduction may be.

In 940, the processing device 122 (e.g., the audio data generation module 430 or the combination unit 436) may stitch the bone conduction audio data and the air conduction audio data based on the weight for each of the multiple segments of each of the bone conduction audio data and the air conduction audio data to generate stitched audio data. The stitched audio data may represent a speech of the user with better fidelity than the bone conduction audio data and/or the air conduction audio data. As used herein, the stitching of the bone conduction audio data and the air conduction audio data may refer to select one or more portions of frequency components of the bone conduction audio data and one or more portions of frequency components of the air conduction data in a frequency domain according to the one or more frequency thresholds and generate audio data based on the selected portions of the bone conduction audio data and the selected portions of the air conduction audio data. A frequency threshold may be also referred to as a frequency stitching point. In some embodiments, a selected portion of the bone conduction audio data and/or the air conduction audio data may include frequency components lower than a frequency threshold. In some embodiments, a selected portion of the bone conduction audio data and/or the air conduction audio data may include frequency components lower than a frequency threshold and greater than another frequency threshold. In some embodiments, a selected portion of the bone conduction audio data and/or the air conduction audio data may include frequency components greater than a frequency threshold.

In some embodiments, the processing device 122 may determine the stitched audio data according to Equation (8) as follows:

$$S_{out} = \overrightarrow{a_m} \cdot \overrightarrow{x_m} + \overrightarrow{b_m} \cdot \overrightarrow{y_m} = \begin{bmatrix} a_{m1} \\ a_{m2} \\ \vdots \\ a_{mN} \end{bmatrix} \cdot \begin{bmatrix} x_{m1} \\ x_{m2} \\ \vdots \\ x_{mN} \end{bmatrix} + \begin{bmatrix} b_{m1} \\ b_{m2} \\ \vdots \\ b_{mN} \end{bmatrix} \cdot \begin{bmatrix} y_{m1} \\ y_{m2} \\ \vdots \\ y_{mN} \end{bmatrix}, \quad (8)$$

where $\overrightarrow{x_m}$ refers to the bone conduction audio data, $\overrightarrow{y_m}$ refers to the air conduction audio data, $\overrightarrow{a_m}$ including ($a_{m1}$, $a_{m2}$, . . . , $a_{mN}$) refers to weights for the multiple segments of the bone conduction audio data, $\overrightarrow{b_m}$ including $(b_{m1}, b_{m2}, \ldots, b_{mN})$ refers to weights for the multiple segments of the air conduction audio data, $(x_{m1}, x_{m2}, \ldots, x_{mN})$ refers to the multiple segments of the bone conduction audio data each of which includes frequency components in a frequency range defined by the frequency thresholds, and $(y_{m1}, y_{m2}, \ldots, y_{mN})$ refers to the multiple segments of the air conduction audio data each of which includes frequency components in a frequency range defined by the frequency thresholds. For example, $x_{m1}$ and $y_{m1}$ may include frequency components of the bone conduction audio data and the air conduction audio data lower than 1000 Hz, respectively. As another example, $x_{m2}$ and $y_{m2}$ may include frequency components of the bone conduction audio data and the air conduction audio data in a frequency range greater than 1000 Hz and less than 4000 Hz, respectively. N may be a constant, such as 1, 2, 3, etc. $a_{mn(n=1, 2, \ldots N)}$ may be a constant in a range from 0 to 1. $b_{mn(n=1, 2, \ldots N)}$ may be a constant in a range from 0 to 1. $a_{mn(n=1, 2, \ldots N)}$ and $b_{mn(n=1, 2, \ldots N)}$ may satisfy a criterion such that a sum of $a_{mn(n=1, 2, \ldots N)}$ and $b_{mn(n=1, 2, \ldots N)}$ is equal to 1. In some embodiments, N may be equal to 2. The processing device 122 may determine two segments for each of the bone conduction audio data and the air conduction audio data according to one single frequency threshold. For example, the processing device 122 may determine a lower portion of the bone conduction audio data (or the air conduction audio data) and a higher portion of the bone conduction audio data (or the air conduction audio data) according to the one single frequency threshold. The lower portion of the bone conduction audio data (or the air conduction audio data) may include frequency components of the bone conduction audio data (or the air conduction audio data) lower than the one single frequency threshold, and the higher portion of the bone conduction audio data (or the air conduction audio data) may include frequency components of the bone conduction audio data (or the air conduction audio data) higher than the one single frequency threshold. In some embodiments, the processing device 122 may determine the lower portion o and the lower portion of the bone conduction audio data (or the air conduction audio data) based on one or more filters. The one or more filters may include a low-pass filter, a high-pass filter, a band-pass filter, or the like, or any combination thereof.

In some embodiments, the processing device 122 may determine, at least in part based on the single frequency threshold, a first weight and a second weight for the lower portion of the bone conduction audio data and the higher portion of the bone conduction audio data, respectively. The processing device 122 may determine, at least in part based on the single frequency threshold, a third weight and a fourth weight for the lower portion of the air conduction audio data and the higher portion of the air conduction audio data, respectively. In some embodiments, the first weight, the second weight, the third weight, and the fourth weight may be determined based on the SNR of the air conduction audio data. For example, the processing device 122 may determine the first weight is less than the third weight, and/or the second weight is greater than the forth weigh if the SNR of the air conduction audio data is greater than a threshold. As another example, the processing device 122 may determine a plurality of SNR ranges, each of SNR ranges may correspond to values of the first weight, the second weight, the third weight, and the fourth weight, respectively. The first weight and the second weight may be the same or different, and the third weight and the fourth weight may be the same or different. A sum of the first weight and the third weight may be equal to 1. A sum of the second weight and the fourth weight may be equal to 1. The first weight, the second weight, the third weight and/or the fourth weight may be a constant in a range from 0 to 1, such as 1, 0.9, 0.8, 0.7, 0.3, 0.4, 0.5, 0.6, 02, 0.1, 0, etc. In some embodiments, the processing device 122 may determine the stitched audio data by weighting the lower portion of the bone conduction audio data, the higher portion of the bone conduction audio data, the lower portion of the air conduction audio data, and the higher portion of the air conduction audio data, using the first weight, the second weight, the third weight, and the fourth weight, respectively. For example, the processing device 122 may determine a lower portion of the stitched audio data by weighting and summing the lower portion of the bone conduction audio data and the lower portion of the air conduction audio data using the first weight and the third weight. The processing device 122 may determine a higher portion of the stitched audio data by weighting and summing the higher portion of the bone conduction audio data and the higher portion of the air conduction audio data using the second weight and the fourth weight. The processing device 122 may stitch the lower portion of the stitched audio data and the higher portion of the stitched audio data to obtain the stitched audio data.

Figure 14A:
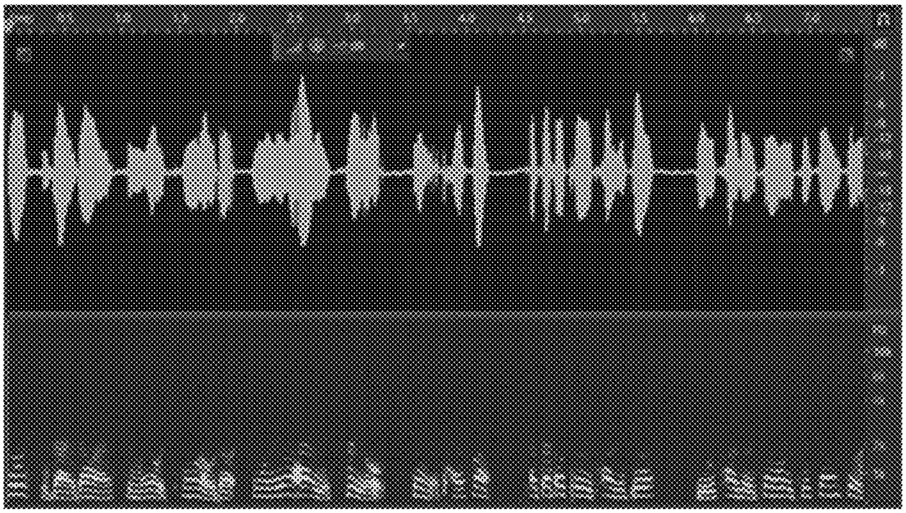
FIG. 14A is a time-frequency diagram illustrating bone conduction audio data according to some embodiments of the present disclosure.
Figure 14B:
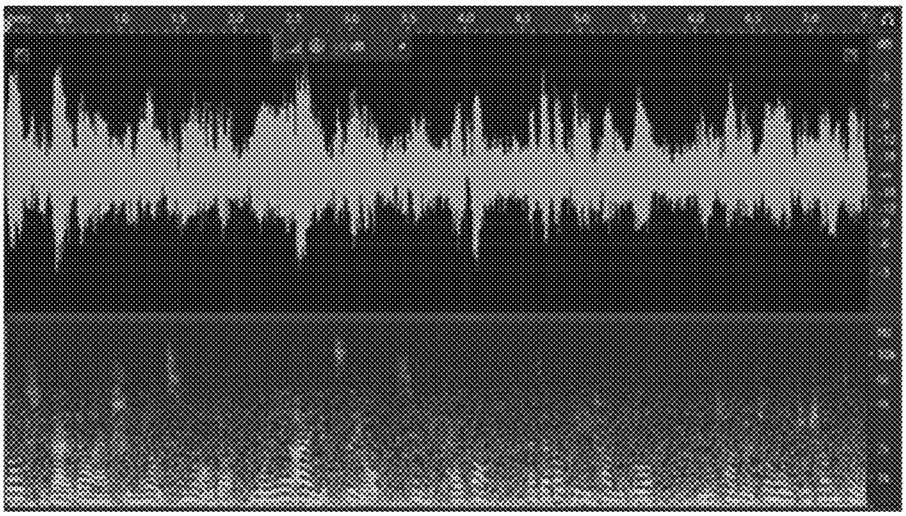
FIG. 14B is a time-frequency diagram illustrating air conduction audio data according to some embodiments of the present disclosure.
Figure 14C:
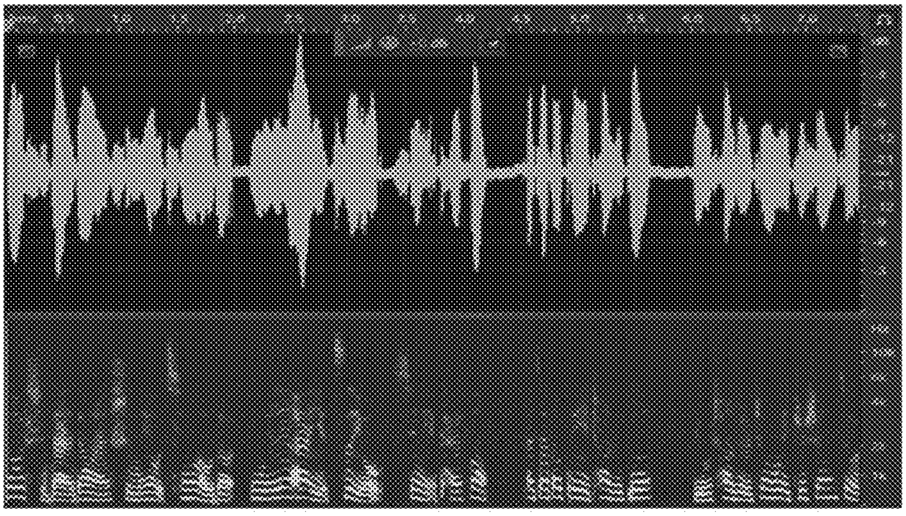
FIG. 14C is a time-frequency diagram illustrating stitched audio data generated by stitching bone conduction audio data and air conduction audio data at a frequency threshold of 2 kHz according to some embodiments of the present disclosure.

In some embodiments, the first weight for the lower portion of the bone conduction audio data may be equal to 1 and the second weight for the higher portion of the bone conduction audio data may be equal to 0. The third weight for the lower portion of the air conduction audio data may be equal to 0 and the fourth weight for the higher portion of the air conduction audio data may be equal to 1. The stitched audio data may be generated by stitching the lower portion of the bone conduction audio data and the higher portion of the air conduction audio data. In some embodiments, the stitched audio data may be different according to different one single frequency thresholds. For example, as shown in FIG. 14A to 14C, FIGS. 14A to 14C are time-frequency diagrams illustrating stitched audio data generated by stitching specific bone conduction audio data and specific air conduction audio data at a frequency point of 2000 Hz, 3000 Hz, and 4000 Hz, respectively, according to some embodiments of the present disclosure. The amount of noises in the stitched audio data in FIGS. 14A, 14B, and 14C are different from each other. The greater the frequency point is, the less the amount of noises in the stitched audio data is.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 10:
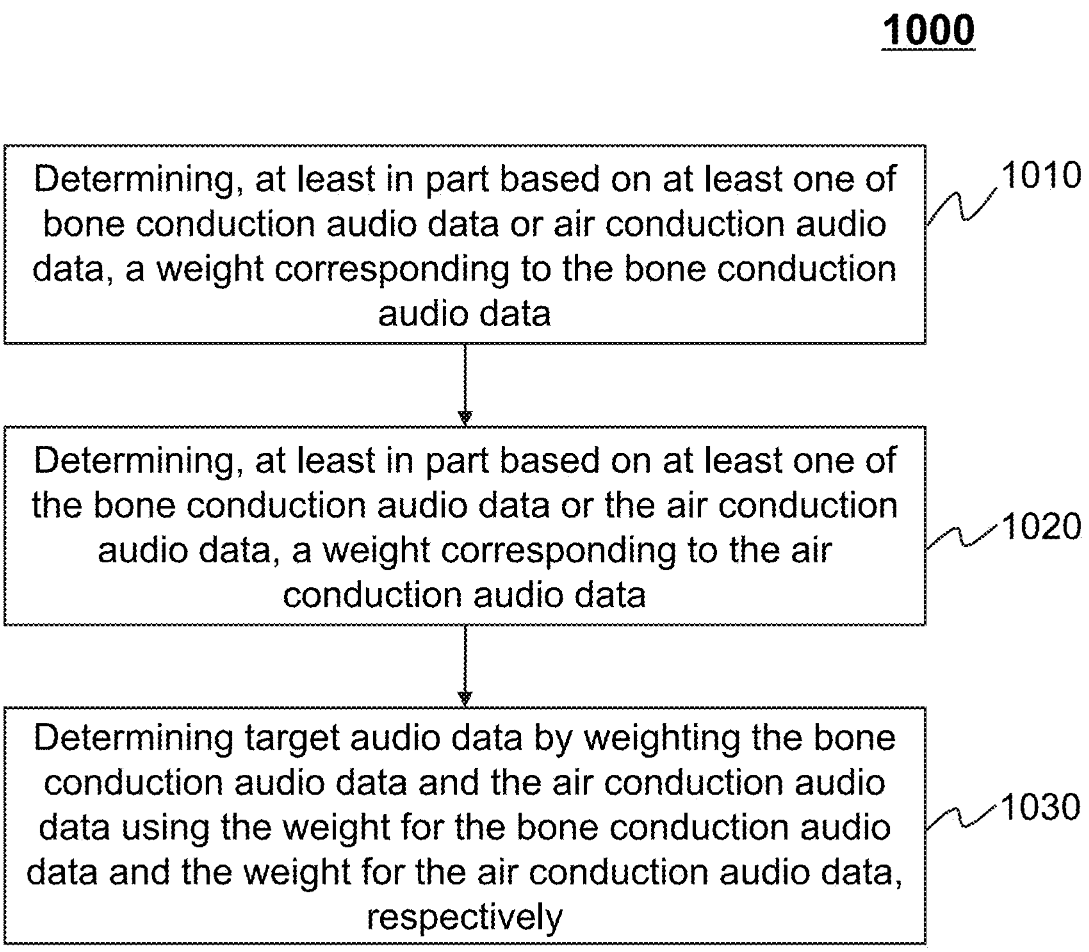
FIG. 10 is a schematic flowchart illustrating an exemplary process for generating audio data according to some embodiments of the present disclosure.

FIG. 10 is a schematic flowchart illustrating an exemplary process for generating audio data according to some embodiments of the present disclosure. In some embodiments, a process 1000 may be implemented as a set of instructions (e.g., an application) stored in the storage device 140, ROM 230 or RAM 240, or storage 390. The processing device 122, the processor 220 and/or the CPU 340 may execute the set of instructions, and when executing the instructions, the processing device 122, the processor 220 and/or the CPU 340 may be configured to perform the process 1000. The operations of the illustrated process presented below are intended to be illustrative. In some embodiments, the process 1000 may be accomplished with one or more additional operations not described and/or without one or more of the operations discussed. Additionally, the order in which the operations of the process 1000 illustrated in FIG. 10 and described below is not intended to be limiting. In some embodiments, one or more operations of the process 1000 may be performed to achieve at least part of operation 540 as described in connection with FIG. 5.

In 1010, the processing device 122 (e.g., the audio data generation module 430 or the weight determination unit 434) may determine, at least in part based on at least one of bone conduction audio data or air conduction audio data, a weight corresponding to the bone conduction audio data. In some embodiments, the bone conduction audio data and the air conduction audio data may be simultaneously obtained by a bone conduction sensor and an air conduction sensor respectively when a user speaks. The air conduction audio data and the bone conduction audio data may represent the speech of the user. More descriptions about the bone conduction audio data and the air conduction audio data may be found in FIG. 5 and the descriptions thereof.

In some embodiments, the processing device 122 may determine the weight for the bone conduction audio data based on an SNR of the air conduction audio data. More descriptions for determining the SNR of the air conduction audio data may be found elsewhere in the present disclosure (e.g., FIG. 9 and the descriptions thereof). The greater the SNR of the air conduction audio data is, the lower the weight for the bone conduction audio data may be. For example, if the SNR of the air conduction audio data is greater than a predetermined threshold, the weight for the bone conduction audio data may be set as value A, and if the SNR of the air conduction audio data is less than the predetermined threshold, the weight for the bone conduction audio data may be set as value B, and A<B. As another example, the processing device 122 may determine the weight for the bone conduction audio data according to Equation (9) as follows:

$$W_{bone} = \begin{cases} a1 & (SNR < A1 \text{ dB}) \\ a2 & (A1 < SNR < A2 \text{ dB}), \\ a3 & (SNR > A2 \text{ dB}) \end{cases} \tag{9}$$

where a1>a2>a3. A1 and/or A2 may be default settings of the audio signal generation system 100. As a further example, the processing device 122 may determine a plurality of SNR ranges, each of which corresponds to a value of the weight for the bone conduction audio data, such as the Equation (10):

$$W_{bone} = \begin{cases} 0.8 & (SNR < 0 \text{ dB}) \\ 0.5 & (0 \text{ dB} < SNR < 40 \text{ dB}), \\ 0.2 & (SNR > 40 \text{ dB}) \end{cases} \tag{10}$$

where $W_{bone}$ refers to the weight corresponding to the bone conduction audio data.

In 1020, the processing device 122 (e.g., the audio data generation module 430 or the weight determination unit 434) may determine, at least in part based on at least one of the bone conduction audio data or the air conduction audio data, a weight corresponding to the air conduction audio data. The techniques used to determine the weight for the air conduction audio data may be the similar to or same as the techniques used to determine the weight for the bone conduction audio data as described in operation 1010. For example, the processing device 122 may determine the weight for the air conduction audio data based on an SNR of the air conduction audio data. More descriptions for determining the SNR of the air conduction audio data may be found elsewhere in the present disclosure (e.g., FIG. 9 and the descriptions thereof). The greater the SNR of the air conduction audio data is, the higher the weight for the air conduction audio data may be. As another example, if the SNR of the air conduction audio data is greater than a predetermined threshold, the weight for the air conduction audio data may be set as value X, and if the SNR of the air conduction audio data is less than the predetermined threshold, the weight for the air conduction audio data may be set as value Y, and X>Y. The weight for the bone conduction audio data and the weight for the air conduction audio data may satisfy a criterion, such that a sum of the weight for the bone conduction audio data and the weight for the air conduction audio data is equal to 1. The processing device 122 may determine the weight for the air conduction audio data based on the weight for the bone conduction audio data. For example, the processing device 122 may determine the weight for the air conduction audio data based on a difference between value 1 and the weight for the bone conduction audio data.

In 1030, the processing device 122 (e.g., the audio data generation module 430 or the combination unit 436) may determine target audio data by weighting the bone conduction audio data and the air conduction audio data using the weight for the bone conduction audio data and the weight for the air conduction audio data, respectively. The target audio data may represent a speech of the user same as what the bone conduction audio data and the air conduction audio data represent. In some embodiments, the processing device 122 may determine the target audio data according to Equation (11) as follows:

$$S_{out} = \begin{cases} a_1 S_{air} + b_1 S_{bone} & (SNR < A1) \\ a_2 S_{air} + b_2 S_{bone} & (A1 < SNR < A2), \\ a_3 S_{air} + b_3 S_{bone} & (SNR > A2) \end{cases} \tag{11}$$

where $S_{air}$ refers to the air conduction audio data, $S_{bone}$ refers to the bone conduction audio data, $a_1$ refers to the weight for the air conduction audio data, $b_1$ refers to the weight for the bone conduction audio data, and $S_{out}$ refers to the target audio data. $a_n$ and $b_n$ may satisfy a criterion such that a sum of $a_n$ and $b_n$ is equal to 1. For example, the target audio data may be determined according to Equation (12) as follows:

$$S_{out} = \begin{cases} 0.2 S_{air} + 0.8 S_{bone} & (SNR < A1) \\ 0.5 S_{air} + 0.5 S_{bone} & (A1 < SNR < A2). \\ 0.8 S_{air} + 0.2 S_{bone} & (SNR > A2) \end{cases} \tag{12}$$

In some embodiments, the processing device 122 may transmit the target audio data to a client terminal (e.g., the terminal 130), the storage device 140, and/or any other storage device (not shown in the audio signal generation system 100) via the network 150.

EXAMPLES

The examples are provided for illustration purposes, and not intended to limit the scope of the present disclosure.

Example 1 Exemplary Frequency Response Curves of Bone Conduction Audio Data, Corresponding Reconstructed Bone Conduction Audio Data, and Corresponding Air Conduction Audio Data As shown in FIG. 11, the curve "m" represents a frequency response curve of bone conduction audio data, and the curve "n" represents a frequency response curve of air conduction audio data corresponding to the bone conduction audio data. The bone conduction audio data and the air conduction audio data represent the same speech of a user. The curve "$m_1$" represents a frequency response curve of reconstructed bone conduction audio data generated by reconstructing the bone conduction audio data using a trained machine learning model according to process 600. As shown in FIG. 11, the frequency response curve "$m_1$" is more similar or close to the frequency response curve "n" than the frequency response curve "m". In other words, the reconstructed bone conduction audio data is more similar or close to the air conduction audio data than the bone conduction audio data. Further, a portion of the frequency response curve "$m_1$" of the reconstructed bone conduction audio data lower than a frequency point (e.g., 2000 Hz) is similar or close to that of the air conduction audio data.

Figure 12A:
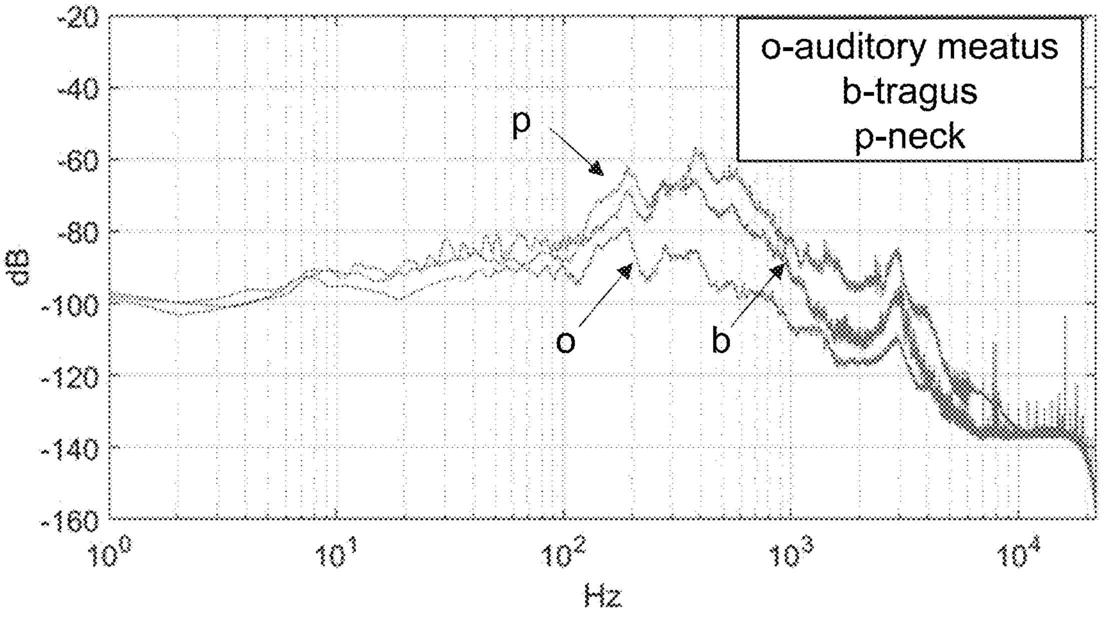
FIG. 12A is a diagram illustrating frequency response curves of bone conduction audio data collected by bone conduction sensors positioned at different regions of the body of a user according to some embodiments of the present disclosure.

Example 2 Exemplary Frequency Response Curves of Bone Conduction Audio Data Collected by Bone Conduction Sensors Positioned at Different Regions of the Body of a User As shown in FIG. 12A, the curve "p" represents a frequency response curve of bone conduction audio data collected by a first bone conduction sensor positioned at the neck of the user's body. The curve "b" represents a frequency response curve of bone conduction audio data collected by a second bone conduction sensor positioned at the tragus of the user's body. The curve "o" represents a frequency response curve of bone conduction audio data collected by a third bone conduction sensor positioned the auditory meatus (e.g., the external auditory meatus) of the user's body. In some embodiments, the second bone conduction sensor and the third bone conduction sensor may be the same as the first bone conduction sensor in the configuration. The bone conduction audio data collected by the first bone conduction sensor, the bone conduction audio data collected by the second bone conduction sensor, and the bone conduction audio data collected by the third bone conduction sensor represent the same speech of the user collected by the first bone conduction sensor, the second bone conduction sensor, and the third bone conduction sensor, respectively at the same time. In some embodiments, the first bone conduction sensor, the second bone conduction sensor, and the third bone conduction sensor may be different from each other in the configuration.

As shown in FIG. 12A, the frequency response curve "p," the frequency response curve "b", and the frequency response curve "o" are different from each other. In other words, the bone conduction audio data collected by the first bone conduction sensor, the bone conduction audio data collected by the second bone conduction sensor, and the bone conduction audio data collected by the third bone conduction sensor are different as the regions of the user's body where the first bone conduction sensor, and the second bone conduction sensor, and the third bone conduction sensor positioned. For example, a response value of a frequency component less than 1000 Hz in the bone conduction audio data collected by the first bone conduction sensor positioned at the neck of the user's body is greater than a response value of a frequency component less than 1000 Hz in the bone conduction audio data collected by the second bone conduction sensor positioned at the tragus of the user's body. A frequency response curve may reflect ability that a bone conduction sensor converts energy of sound into electrical signals. According to the frequency response curves "p" "b", and "o", response values corresponding to a frequency range from 0 to about 5000 Hz are greater than response values corresponding to a frequency range greater than about 5000 HZ where the bone conduction sensors are located at the different regions of the user's body. Response values corresponding to a frequency range from 0 to about 2000 Hz changes stably than response values corresponding to a frequency exceeding about 2000 Hz where the bone conduction sensors are located at the different regions of the user's body. In other words, the bone conduction sensor may collect a lower frequency component of an audio signal, such as 0 to about 2000 Hz, or 0 to about 5000 Hz.

Therefore, according to FIG. 12A, a bone conduction device for collecting and/or playing audio signals may include the bone conduction sensor for collecting bone conduction audio signals which may be located at a region of a user's body determined based on the mechanical design of the bone conduction device. The region of the user's body may be determined based on one or more characteristics of a frequency response curve, signal intensity, comfort level of the user, etc. For example, the bone conduction device may include the bone conduction sensor for collecting audio signals such that the bone conduction sensor may be positioned at and/or contact with the tragus of the user when the user wears the bone conduction device such that the signal intensity of audio signals collected by the bone conduction sensor is high relatively.

Figure 12B:
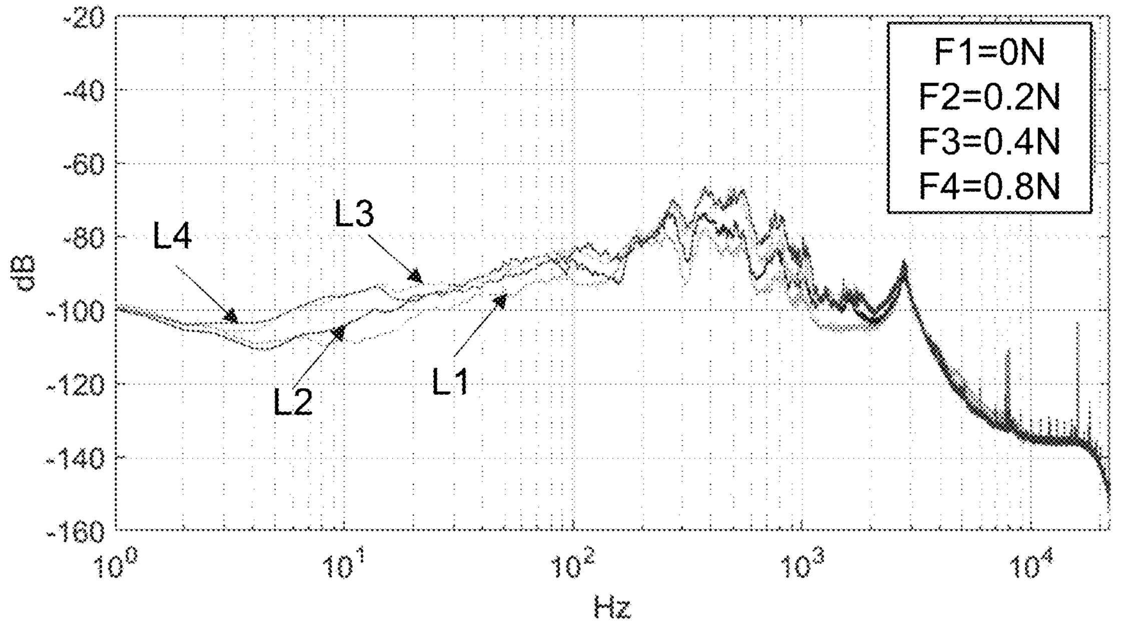
FIG. 12B is a diagram illustrating frequency response curves of bone conduction audio data collected by bone conduction sensors positioned at different regions of the body of a user according to some embodiments of the present disclosure.

Example 3 Exemplary Frequency Response Curves of Bone Conduction Audio Data Collected by Bone Conduction Sensors Positioned at a Same Region of the Body of a User with Different Pressures As shown in FIG. 12B, the curve "L1" represents a frequency response curve of bone conduction audio data collected by a bone conduction sensor positioned at the tragus of the user's body with pressure F1 of 0N. As used herein, the pressure on a region of a user's body may be also referred to as a clamping force applied by a bone conduction sensor to the region of the user's body. The curve "L2" represents a frequency response curve of bone conduction audio data collected by the bone conduction sensor positioned at the tragus of the user's body with pressure F2 of 0.2N. The curve "L3" represents a frequency response curve of bone conduction audio data collected by the bone conduction sensor positioned at the tragus of the user's body with pressure F3 of 0.4N. The curve "L4" represents a frequency response curve of bone conduction audio data collected by the bone conduction sensor positioned at the tragus of the user's body with pressure F4 of 0.8N. As shown in FIG. 12B, the frequency response curves "L1"-"L4" are different from each other. In other words, the bone conduction audio data collected by the bone conduction sensor by applying different pressures to a region of a user's body are different.

As the different pressures supplied by a bone conduction sensor on a region of a user's body, bone conduction audio data collected by the bone conduction sensor may be different. The signal intensity of the bone conduction audio data collected by the bone conduction sensor may be different as the different pressures. The signal intensity of the bone conduction audio data may increase gradually at first and then the increase of the signal intensity may slow down to saturation when the pressure increases from 0N to 0.8N. However, the greater the pressure applied by a bone conduction sensor on a region of a user's body, the more uncomfortable the user may be. Therefore, according to FIGS. 12A and 12B, a bone conduction device for collecting and/or playing audio signals may include a bone conduction sensor for collecting bone conduction audio signals which may be located at a specific region of a user's body with a clamping force in a range to the specific region of the user's body, etc., according to the mechanical design of the bone conduction device. The region of the user's body and/or the clamping force to the region of the user's body may be determined based on one or more characteristics of a frequency response curve, signal intensity, comfort level of the user, etc. For example, the bone conduction device may include the bone conduction sensor for collecting audio signals such that the bone conduction sensor may be positioned at and/or contact with the tragus of the user with a clamping force in a range 0 to 0.8N, such as 0.2N, or 0.4N, or 0.6N, or 0.8N, etc., when the user wears the bone conduction device, that may ensure the signal intensity of bone conduction audio data collected by the bone conduction sensor is relatively high and simultaneously, the user may feel comfortable as the appropriate clamp force.

Example 4 Exemplary Time-Frequency Diagrams of Stitched Audio Data

Figure 13A:
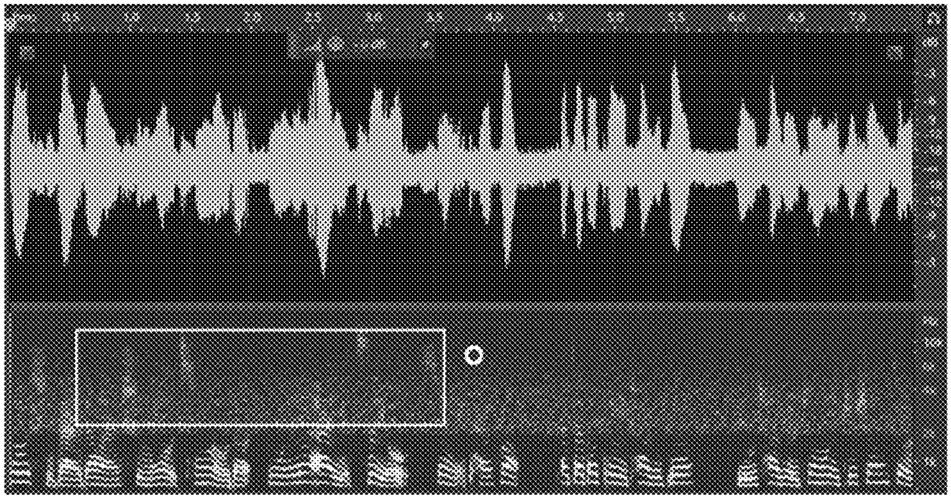
FIG. 13A is a time-frequency diagram illustrating stitched audio data generated by stitching bone conduction audio data and air conduction audio data at a frequency threshold of 2 kHz according to some embodiments of the present disclosure.
Figure 13B:
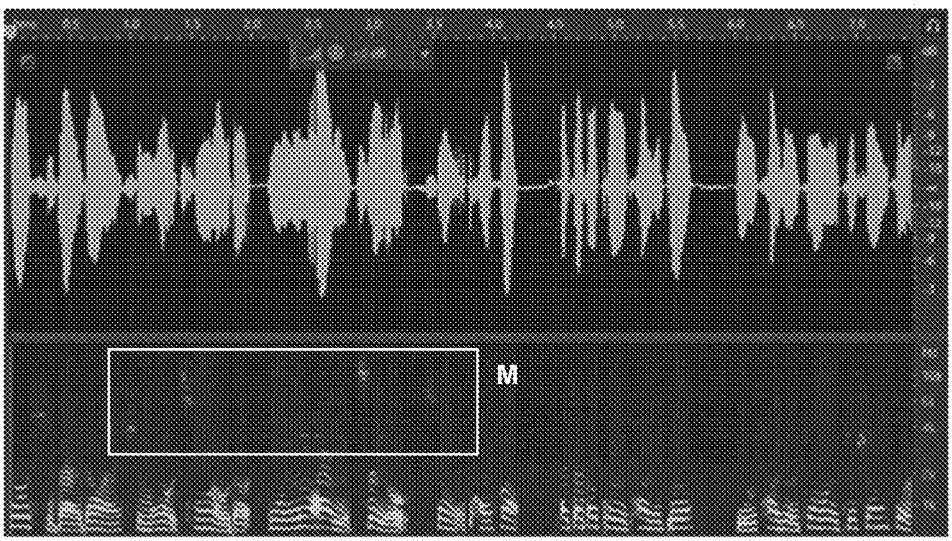
FIG. 13B is a time-frequency diagram illustrating stitched audio data generated by stitching bone conduction audio data and preprocessed air conduction audio data denoised by a wiener filter at a frequency threshold of 2 kHz according to some embodiments of the present disclosure.
Figure 13C:
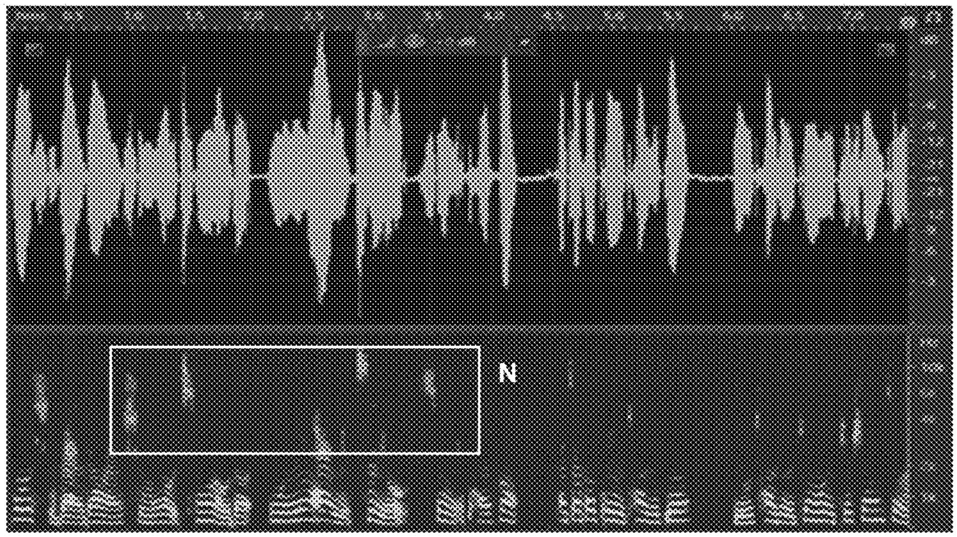
FIG. 13C is a time-frequency diagram illustrating stitched audio data generated by stitching bone conduction audio data and preprocessed air conduction audio data denoised by a spectral subtraction technique at a frequency threshold of 2 kHz according to some embodiments of the present disclosure.

FIG. 13A is a time-frequency diagram of stitched audio data generated by stitching bone conduction audio data and air conduction audio data according to some embodiments of the present disclosure. The bone conduction audio data and the air conduction audio data represent the same speech of a user. The air conduction audio data includes noises. FIG. 13B is a time-frequency diagram of stitched audio data generated by stitching the bone conduction audio data and preprocessed air conduction audio data according to some embodiments of the present disclosure. The preprocessed air conduction audio data was generated by denoising the air conduction audio data using a Wiener filter. FIG. 13C is a time-frequency diagram of stitched audio data generated by stitching the bone conduction audio data and another preprocessed air conduction audio data according to some embodiments of the present disclosure. The another preprocessed audio data was generated by denoising the air conduction audio data using a spectral subtraction technique. The time-frequency diagrams of stitched audio data in the FIGS. 13A to 13C were generated according to the same frequency threshold of 2000 Hz according to process 900. As shown in FIGS. 13A to 13C, frequency components of the stitched audio data in FIG. 13B (e.g., region M) and FIG. 13C (e.g., region N) higher than 2000 Hz have fewer noises than frequency components of the stitched audio data in FIG. 13A (e.g., region O) higher than 2000 Hz, indicating the stitched audio data generated based on denoised air conduction audio data has better fidelity than stitched audio data generated based on the air conduction audio data that is not denoised. Frequency components of the stitched audio data in FIG. 13B higher than 2000 Hz is different from frequency components of the stitched audio data in FIG. 13C higher than 2000 Hz due to the different denoising techniques performed on the air conduction audio data. As shown in FIGS. 13B and 13C, frequency components of the stitched audio data in FIG. 13B (e.g., region M) higher than 2000 Hz have fewer noises than frequency components of the stitched audio data in FIG. 13C (e.g., region N) higher than 2000 Hz.

Figure 14D:
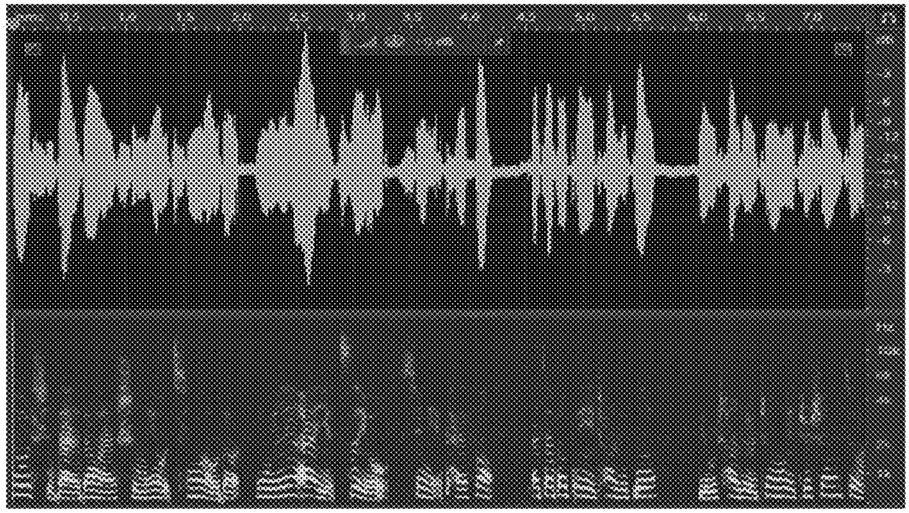
FIG. 14D is a time-frequency diagram illustrating stitched audio data generated by stitching bone conduction audio data and air conduction audio data at a frequency threshold of 3 kHz according to some embodiments of the present disclosure.
Figure 14E:
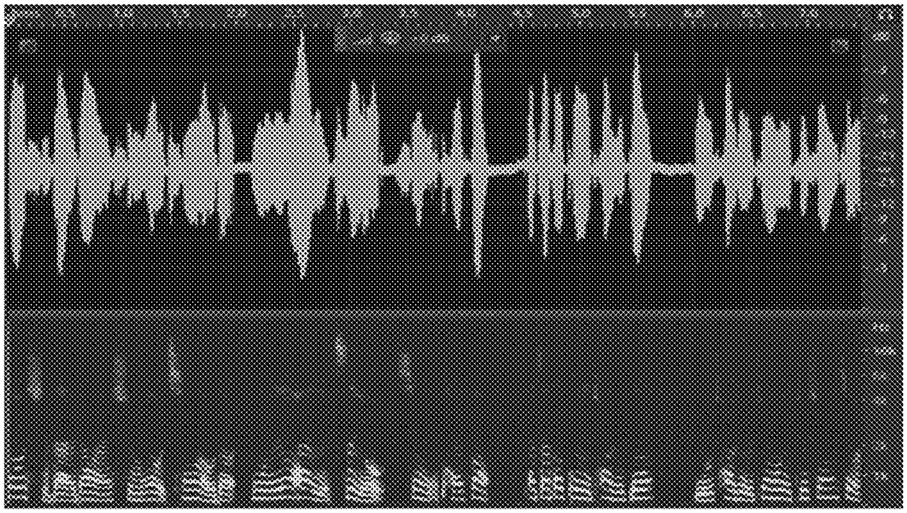
FIG. 14E is a time-frequency diagram illustrating stitched audio data generated by stitching bone conduction audio data and air conduction audio data at a frequency threshold of 4 kHz according to some embodiments of the present disclosure.

Example 5 Exemplary Time-Frequency Diagrams of Stitched Audio Data Generated According to Different Frequency Thresholds FIG. 14A is a time-frequency diagram of bone conduction audio data. FIG. 14B is a time-frequency diagram of air conduction audio data corresponding to the bone conduction audio data. The bone conduction audio data (e.g., the first audio data as described in FIG. 5) and the air conduction audio data (e.g., the second audio data as described in FIG. 5) were simultaneously collected by a bone conduction sensor and an air conduction sensor, respectively when a user makes a speech. FIGS. 14C to 14E are time-frequency diagrams of stitched audio data generated by stitching the bone conduction audio data and the air conduction audio data at a frequency threshold (or frequency point) of 2000 Hz, 3000 Hz and 4000 Hz, respectively, according to some embodiments of the present disclosure. Comparing the time-frequency diagrams of the stitched audio data shown in FIGS. 14C to 14E with the time-frequency diagram of the air conduction audio data shown in FIG. 14B, the amount of noises in the stitched audio data in FIGS. 14C, 14D, and 14E are less than the air conduction audio data. The greater the frequency threshold is, the less the amount of noises in the stitched audio data is. Comparing the time-frequency diagrams of the stitched audio data shown in FIGS. 14C to 14E with the time-frequency diagram of the bone conduction audio data shown in FIG. 14A, frequency components less than the frequency thresholds 2000 Hz, 3000 Hz and 4000 Hz respectively in FIGS. 14C to 14E increase with respect to the frequency components less than the frequency thresholds 2000 Hz, 3000 Hz and 4000 Hz in FIG. 14A.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A non-transitory computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A system for audio signal generation, comprising:

at least one storage medium including a set of instructions;

at least one processor in communication with the at least one storage medium, wherein when executing the set of instructions, the at least one processor is directed to cause the system to perform operations including:

obtaining first audio data collected by a bone conduction sensor;

obtaining second audio data collected by an air conduction sensor, the first audio data and the second audio data representing a speech of a user, with differing frequency components; and generating, based on the first audio data and the second audio data, third audio data, wherein frequency components of the third audio data higher than a first frequency point increase with respect to frequency components of the first audio data higher than the first frequency point.

2. The system of claim 1, wherein to generate, based on the first audio data and the second audio data, third audio data, the at least one processor is directed to cause the system to perform operations including:

performing a first preprocessing operation on the first audio data to obtain preprocessed first audio data; and generating, based on the preprocessed first audio data and the second audio data, the third audio data.

3. The system of claim 2, wherein to perform a first preprocessing operation on the first audio data to obtain preprocessed first audio data, the at least one processor is directed to cause the system to perform operations including:

obtaining a trained machine learning model; and determining, based on the first audio data, the preprocessed first audio data using the trained machine learning model, wherein frequency components of the preprocessed first audio data higher than a second frequency point increase with respect to frequency components of the first audio data higher than the second frequency point.

4. The system of claim 3, wherein the trained machine learning model is provided by a process including:

obtaining a plurality of groups of training data, each group of the plurality of groups of training data including bone conduction audio data and air conduction audio data representing a speech sample; and training a preliminary machine learning model using the plurality of groups of training data, the bone conduction audio data in each group of the plurality of groups of training data being as an input of the preliminary machine learning model, and the air conduction audio data corresponding to the bone conduction audio data being as a desired output of the preliminary machine learning model during a training process of the preliminary machine learning model.

5. The system of claim 4, wherein a region of a body where a specific bone conduction sensor is positioned at for collecting the bone conduction audio data in each group of the plurality of groups of training data is the same as a region of a body of the user where the bone conduction sensor is positioned at for collecting the first audio data.

6. The system of claim 4, wherein the preliminary machine learning model is constructed based on a recurrent neural network model or a long short-term memory network.

7. The system of claim 2, wherein to perform a first preprocessing operation on the first audio data to obtain preprocessed first audio data, the at least one processor is directed to cause the system to perform operations including:

obtaining a filter configured to provide a relationship between specific air conduction audio data and specific bone conduction audio data corresponding to the specific air conduction audio data; and determining the preprocessed first audio data using the filter to process the first audio data.

8. The system of claim 1, wherein to generate, based on the first audio data and the second audio data, third audio data, the at least one processor is directed to cause the system to perform operations including:

performing a second preprocessing operation on the second audio data to obtain preprocessed second audio data; and generating, based on the first audio data and the preprocessed second audio data, the third audio data.

9. The system of claim 1, wherein to generate, based on the first audio data and the second audio data, third audio data, the at least one processor is directed to cause the system to perform operations including:

determining, at least in part based on at least one of the first audio data or the second audio data, one or more frequency thresholds; and generating, based on the one or more frequency thresholds, the first audio data, and the second audio data, the third audio data.

10. The system of claim 9, wherein to determine, at least in part based on at least one of the first audio data or the second audio data, the one or more frequency thresholds, the at least one processor is directed to cause the system to perform operations including:

determining a noise level associated with the second audio data; and determining, based on the noise level associated with the second audio data, at least one of the one or more frequency thresholds.

11. The system of claim 10, wherein the noise level associated with the second audio data is denoted by a signal to noise ratio (SNR) of the second audio data, and the SNR of the second audio data is determined by operations including:

determining an energy of noises included in the second audio data using the bone conduction sensor and the air conduction sensor;

determining, based on the energy of noises included in the second audio data, an energy of pure audio data included in the second audio data; and determining, based on the energy of noises included in the second audio data and the energy of pure audio data included in the second audio data, the SNR.

12. The system of claim 10, wherein the greater the noise level associated with the second audio data is, the greater at least one of the one or more frequency thresholds is.

13. The system of claim 9, wherein to determine, at least in part based on at least one of the first audio data or the second audio data, the one or more frequency thresholds, the at least one processor is directed to cause the system to perform operations including:

determining, based on a frequency response curve associated with the first audio data, at least one of the one or more frequency thresholds.

14. The system of claim 9, wherein to generate, based on the one or more frequency thresholds, the first audio data, and the second audio data, third audio data, the at least one processor is directed to cause the system to perform operations including:

stitching the first audio data and the second audio data in a frequency domain according to the one or more frequency thresholds to generate the third audio data.

15. The system of claim 14, wherein to stitch the first audio data and the second audio data in a frequency domain according to the one or more frequency thresholds to generate the third audio data, the at least one processor is directed to cause the system to perform operations including:

determining a lower portion of the first audio data including frequency components lower than one of the one or more frequency thresholds;

determining a higher portion of the second audio data including frequency components higher than the one of the one or more frequency thresholds; and stitching the lower portion of the first audio data and the higher portion of the second audio data to generate the third audio data.

16. The system of claim 1, wherein to generate, based on the first audio data and the second audio data, third audio data, the at least one processor is directed to cause the system to perform operations including:

determining multiple frequency ranges;

determining a first weight and a second weight for a portion of the first audio data and a portion of the second audio data located within each of the multiple frequency ranges, respectively; and determining the third audio data by weighting the portion of the first audio data and the portion of the second audio data located within each of the multiple frequency ranges using the first weight and the second weight, respectively.

17. The system of claim 1, wherein to generate, based on the first audio data and the second audio data, third audio data, the at least one processor is directed to cause the system to perform operations including:

determining, at least in part based on the first frequency point, a first weight and a second weight for a first portion of the first audio data and a second portion of the first audio data, respectively, the first portion of the first audio data including frequency components lower than the first frequency point, and the second portion of the first audio data including frequency components higher than the first frequency point;

determining, at least in part based on the first frequency point, a third weight and a fourth weight for a third portion of the second audio data and a fourth portion of the second audio data, respectively, the third portion of the second audio data including frequency components lower than the first frequency point, and the fourth portion of the second audio data including frequency components higher than the first frequency point; and determining the third audio data by weighting the first portion of the first audio data, the second portion of the first audio data, the third portion of the second audio data, and the fourth portion of the second audio data using the first weight, the second weight, the third weight, and the fourth weight, respectively.

18. The system of claim 1, wherein to generate, based on the first audio data and the second audio data, third audio data, the at least one processor is directed to cause the system to perform operations including:

determining, at least in part based on at least one of the first audio data or the second audio data, a first weight corresponding to the first audio data;

determining, at least in part based on at least one of the first audio data or the second audio data, a second weight corresponding to the second audio data; and determining the third audio data by weighting the first audio data and the second audio data using the first weight and the second weight, respectively.

19. A method for audio signal generation implemented on a computing apparatus, the computing apparatus including at least one processor and at least one storage device, comprising:

obtaining first audio data collected by a bone conduction sensor;

obtaining second audio data collected by an air conduction sensor, the first audio data and the second audio data representing a speech of a user, with differing frequency components; and generating, based on the first audio data and the second audio data, third audio data, wherein frequency components of the third audio data higher than a first frequency point increase with respect to frequency components of the first audio data higher than the first frequency point.

20. A non-transitory computer readable medium, comprising a set of instructions, wherein when executed by at least one processor, the set of instructions direct the at least one processor to perform acts of:

obtaining first audio data collected by a bone conduction sensor;

obtaining second audio data collected by an air conduction sensor, the first audio data and the second audio data representing a speech of a user, with differing frequency components; and generating, based on the first audio data and the second audio data, third audio data, wherein frequency components of the third audio data higher than a first frequency point increase with respect to frequency components of the first audio data higher than the first frequency point.

* * * * *